(12) United States Patent
Chukka et al.

(10) Patent No.: US 10,650,221 B2
(45) Date of Patent: May 12, 2020

(54) SYSTEMS AND METHODS FOR COMPREHENSIVE MULTI-ASSAY TISSUE ANALYSIS

(71) Applicant: Ventana Medical Systems, Inc., Tucson, AZ (US)

(72) Inventors: Srinivas Chukka, San Jose, CA (US); Anindya Sarkar, Milpitas, CA (US); Joerg Bredno, San Francisco, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 15/088,457

(22) Filed: Apr. 1, 2016

(65) Prior Publication Data

US 2016/0321495 A1  Nov. 3, 2016

Related U.S. Application Data

(63) Continuation of application No. PCT/EP2014/071335, filed on Oct. 6, 2014.
(Continued)

(51) Int. Cl.
*G06K 9/00* (2006.01)
*G06T 7/00* (2017.01)

(52) U.S. Cl.
CPC ....... *G06K 9/0014* (2013.01); *G06K 9/00147* (2013.01); *G06T 7/0012* (2013.01);
(Continued)

(58) Field of Classification Search
CPC combination set(s) only.
See application file for complete search history.

(56) References Cited

U.S. PATENT DOCUMENTS

| 5,428,690 A * | 6/1995 | Bacus | G01N 35/00029 356/39 |
| 8,649,981 B2 * | 2/2014 | Sipe | G06K 9/00127 382/128 |

(Continued)

FOREIGN PATENT DOCUMENTS

| EP | 2227774 A1 * | 9/2010 | ........... G06K 9/0014 |
| EP | 2227774 A1 * | 9/2010 | ........... G06T 7/0014 |

(Continued)

OTHER PUBLICATIONS

International Preliminary Report on Patentability dated Apr. 21, 2016 in corresponding PCT Application No. PCT/EP2014/071335 filed Oct. 6, 2014, 10 pages.
(Continued)

*Primary Examiner* — Tsung Yin Tsai
(74) *Attorney, Agent, or Firm* — Kilpatrick Townsend & Stockton LLP

(57) ABSTRACT

The subject disclosure presents systems and methods for receiving a plurality of assay information along with a query for one or more features of interest, and projecting anatomical information from an anatomical assay onto a staining assay, for example an immunohistochemical (IHC) assay that is commonly registered with the anatomical assay, to locate or determine features appropriate for analysis. The anatomical information may be used to generate a mask that is projected on one or more commonly registered staining assays. A location of the feature of interest in the staining assay may be correlated with the anatomical context provided by the mask, with any features of interest that match the anatomical mask being selected or indicated as appropriate for analysis.

20 Claims, 23 Drawing Sheets

Related U.S. Application Data

(60) Provisional application No. 61/887,585, filed on Oct. 7, 2013.

(52) U.S. Cl.
CPC .. G06T 7/0014 (2013.01); *G06T 2207/10056* (2013.01); *G06T 2207/20104* (2013.01); *G06T 2207/30024* (2013.01); *G06T 2207/30068* (2013.01); *G06T 2207/30072* (2013.01); *G06T 2207/30096* (2013.01)

(56) References Cited

U.S. PATENT DOCUMENTS

| | | | |
|---|---|---|---|
| 2001/0041347 A1 | 11/2001 | Sammak | |
| 2002/0177149 A1* | 11/2002 | Rimm | G01N 21/6458 435/6.16 |
| 2003/0231791 A1* | 12/2003 | Torre-Bueno | G01N 21/6428 382/133 |
| 2005/0037406 A1* | 2/2005 | De La Torre-Bueno | G01N 21/6428 435/6.12 |
| 2006/0045348 A1* | 3/2006 | Kiros | G01N 15/1475 382/190 |
| 2008/0032328 A1* | 2/2008 | Cline | G01N 1/30 435/40.5 |
| 2008/0033657 A1* | 2/2008 | Cline | G06K 9/0061 702/19 |
| 2008/0096980 A1* | 4/2008 | Finkbeiner | C07K 14/001 514/789 |
| 2010/0061618 A1* | 3/2010 | Marcelpoil | G01N 1/30 382/133 |
| 2012/0076390 A1 | 3/2012 | Potts et al. | |
| 2013/0051651 A1* | 2/2013 | Leary | G06T 7/0012 382/133 |
| 2014/0348410 A1* | 11/2014 | Grunkin | G06F 19/321 382/133 |
| 2014/0377753 A1* | 12/2014 | Bamford | G06T 7/0012 435/6.11 |
| 2016/0042511 A1* | 2/2016 | Chukka | G06T 7/0012 382/133 |
| 2016/0098590 A1* | 4/2016 | Bredno | G06T 7/11 382/133 |

FOREIGN PATENT DOCUMENTS

| | | |
|---|---|---|
| GB | 2414074 A | 11/2005 |
| JP | 2010500571 A5 | 1/2010 |

OTHER PUBLICATIONS

International Search Report dated Dec. 16, 2014 in corresponding PCT Application No. PCT/EP2014/071335 filed Oct. 6, 2014, 4 pages.
PCT Written Opinion dated Dec. 16, 2014 in corresponding PCT Application No. PCT/EP2014/071335 filed Oct. 6, 2014, 7 pages.
Japanese Office Action dated May 1, 2018 in corresponding Japanese Patent Application JP2016-520065.

\* cited by examiner

HE image

Soft weighted foreground image extracted from the HE image

Computing Weighted H image

- levelH = OTSU based threshold on H channel
- lowH = fraction*levelH
- maxH = max(Weighted H)
- slopeH = (maxH−lowH)

IHC image

Soft weighted foreground image extracted
From IHC image in Fig. 17(a)

Computing Weighted DAB image

- levelBr = OTSU based threshold on Brown (DAB) channel
- lowBr = fraction*levelBr
- maxBr = max(Weighted DAB)
- slopeBr = (maxBr−lowBr)

Rotated foreground HE
image on a bigger grid

IHC foreground image on a
bigger grid, aligned with
bigger HE grid

Let rectangle B in big image grid, corresponding to image 2, be 375x375 window; if we shift the rectangle by 1 pixel either way, there are 75x75 possible positions of the rectangle; similarly, if we allow shifts of 5 pixels, possible positions to search= (75/5)x(75/5) = 225

Let rectangle A in big image grid, corresponding to image 1, be 300x300 window

SYSTEMS AND METHODS FOR COMPREHENSIVE MULTI-ASSAY TISSUE ANALYSIS

CROSS-REFERENCE TO RELATED APPLICATIONS

This patent application is a continuation of International Patent Application No. PCT/EP2014/071335 filed Oct. 6, 2014, which claims priority to and the benefit of U.S. Provisional Patent Application No. 61/887,585 filed Oct. 7, 2013. Each patent application is incorporated herein by reference as if set forth in its entirety.

BACKGROUND OF THE SUBJECT DISCLOSURE

1. Field of the Subject Disclosure

The present subject disclosure relates to imaging for medical diagnosis. More particularly, the present subject disclosure relates to comprehensive multi-assay tissue analysis.

2. Background of the Subject Disclosure

In the analysis of biological specimens such as tissue sections, blood, cell cultures and the like, biological specimens are mounted on slides and stained with one or more combinations of stain and biomarkers, and the resulting assay is viewed or imaged for further analysis. Observing the assay enables a variety of processes, including diagnosis of disease, assessment of response to treatment, and development of new drugs to fight disease. An H&E assay includes two stains (Hematoxylin and Eosin) that identify tissue anatomy information (cell nuclei and proteins, respectively). A special staining assay identifies target substances in the tissue based on their chemical character, biological character, or pathological character. An immunohistochemistry (IHC) assay includes one or more stains conjugated to an antibody that binds to protein, protein fragments, or other structures of interest in the specimen, hereinafter referred to as targets. The antibodies, other compounds, or substances that bind a target in the specimen to a stain are referred to as biomarkers in this subject disclosure. For an H&E or a special staining assay, biomarkers have a fixed relationship to a stain (e.g., the often used counterstain hematoxylin), whereas for an IHC assay, a choice of stain may be used for a biomarker to develop and create a new assay. Biological specimens such as tissue sections from human subjects are prepared according to an assay before imaging. Upon applying a single light source, a series of multiple light sources, or any other source of input spectra to the tissue, the assay can be assessed by an observer, typically through a microscope, or image data can be acquired from the assay for further processing. In such an acquisition, multiple channels of image data, for example color channels, are derived, with each observed channel comprising a mixture of multiple signals. Processing of this image data can include methods of color separation, spectral unmixing, color deconvolution, etc. that are used to determine a local concentration of specific stains from the observed channel or channels of image data. For image data processed by automated methods, depicted on a display, or for an assay viewed by an observer, a relation may be determined between the local appearance of the stained tissue and the applied stains and biomarkers to determine a model of the biomarker distribution in the stained tissue.

However, the prior art does not disclose an efficient method or system for querying multiple biomarkers in a multiplex assay, particularly in cases where contextual information about the tissue specimen, anatomical detail information, and co-location information is relevant to the analysis. A representative example is the case of tumor heterogeneity, wherein one or more cancerous glands may be caused by or propagated due to a variety of reasons. In other words, cancer is becoming known to be a multi-disease state, and tumors can grow cancerous for multiple reasons. For a surgically-extracted tissue block including a tumor gland, items of interest queried from the specimens could indicate which therapies are likely or promising. A combination of macro tissue information with microanatomical definitions may be required prior to analyzing the biomarkers. The cells of interest may include, for instance, tumor cells, normal tissue epithelium, stromal cells, vascular cells, and immune cells. A multitude of immune cells and immune cell differentiations may need to be queried for a comprehensive immune assay. For instance, while performing a tumor microenvironment assessment, different biomarkers are known that indicate the presence of different cells and their differentiation in and around a tumor. A left half of a tumor may have a different genetic makeup than the right half. For breast cancer patients, a standard breast panel includes slides stained with assays including estrogen/progesterone receptors, proliferation markers, etc. The combined location and intensity of different cells in the tissue and/or tumor cells with different expression, for example, gene or protein expression, separated into different anatomical regions, would be indicative of general and therapy-dependent patient prognosis.

Present methods for multiplex IHC staining involve imaging with fluorescent or brightfield multi-spectral imagers to provide rich input to determine the presence and co-location of the stains within the same tissue. However, such assays are not readily available as they require non-standard staining and imaging techniques and equipment. An increase in a number of queried biomarkers further complicates the analysis. Multiple assays or stains are required to identify each of the cells and their differentiation in a tumor microenvironment as well as the anatomic structures themselves. Moreover, manual outlining of the same region of tissue on multiple input images is labor-intensive, tedious, and error-prone, and therefore not considered commercially viable. Today's analyses are therefore limited to one or a few biomarkers queried on a single slide, or on multiple markers on multiple slides taken from the same tissue. Generally, a qualitative or visual assignment of anatomical context is often left to an observer who has to repeat this step on each slide. However, simply looking at individual results will result in therapy selection that does not target all parts of the tumor as this might not reflect heterogeneous regional or anatomical differences of the biomarker distribution in a tumor.

SUMMARY OF THE SUBJECT DISCLOSURE

The subject disclosure cures these above-identified problems in the prior art by presenting systems and methods for receiving a plurality of assay information along with a query for one or more features of interest, and projecting anatomical information from an anatomical assay onto an image of a staining assay, for example, an immunohistochemical (IHC) assay that is commonly registered with the anatomical assay, to locate or determine features appropriate for analysis. The anatomical information may be used to generate a mask that is projected on one or more commonly registered staining or IHC assays. A location of the feature of interest in the IHC assay may be correlated with the anatomical context provided by the mask, with any features of interest that match the anatomical mask being selected or indicated as appropriate for analysis. Furthermore, the anatomical mask may be partitioned into multiple regions, and multiple features of interest from multiple IHC assays may be correlated with each of these regions individually. Therefore, the disclosed systems and methods provide systematic, quantitative, and intuitive approaches for comprehensive multi-assay analysis, thereby overcoming the limiting ad-hoc or subjective visual analysis steps in the state of the art.

DETAILED DESCRIPTION OF THE SUBJECT DISCLOSURE

Figure 1:
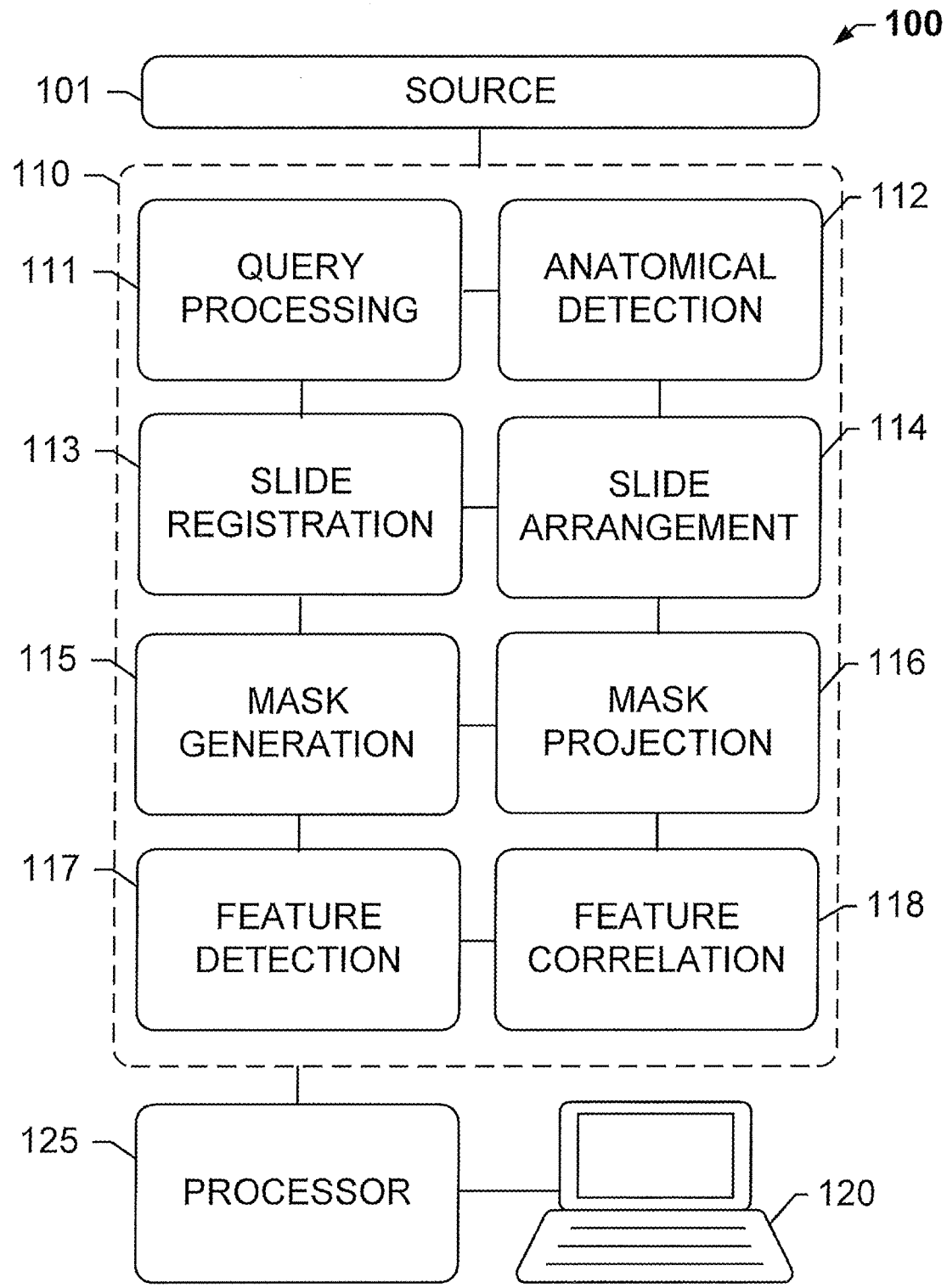
FIG. 1 shows a system for analyzing multiple assays, according to an exemplary embodiment of the present subject disclosure.

The following detailed description presents several exemplary embodiments for comprehensive multi-assay analysis. Computer processors in combination with computer-readable media are configured to perform operations including receiving a plurality of assay information along with a query for one or more features of interest, and projecting anatomical information from an anatomical assay onto a staining assay, for example an immunohistochemical (IHC) or special staining assay that is commonly registered with the anatomical assay, to locate or determine features appropriate for analysis. The anatomical information may be used to generate a mask that is applied to or projected on one or more IHC or special staining assays, depending on the features of interest identified in the query. Furthermore, features of interest from multiple slides that have been identified in a query may be projected onto this mask or the anatomical slide on which the mask was generated. The subject disclosure is applicable to all staining techniques, including H&E, special stains, IHC, or any application of a substance or chemical compound that binds to a feature of interest and how it appears under the microscope. The information generated by any one or more of the stains and/or assays may be used as a mask. The invention is described with respect to an IHC assay, but this is for exemplary purposes. The present invention applies more broadly to staining assays rather than simply IHC assays. It would be understood by one of ordinary skill in the art that features of biological objects can be identified with a multitude of different staining techniques.

The slides for each assay comprise adjacent cuts of a tissue specimen to be analyzed. Common registration between an anatomical assay and an IHC assay may be established by detecting common spatial features in both assays. Thereafter, a mask may be generated, comprising information, for example, anatomical information about a region or micro-anatomical feature of the tissue anatomy or information about locations in the tissue that can be analyzed on this and/or other slides. The mask may include an identification of tumor and normal tissue as macroscopic features and the identification of tumor glands and intratumoral connective tissue (stroma) as microscopic features. Tumor glands or other microanatomical regions in a tumor may be defined by tumor properties, for example highly proliferative or highly necrotic regions, as identified by a micro-anatomical assay. The macro and micro anatomical features may be determined by more than one anatomical assay, and may alternatively or additionally be specified via a user interface. A location of the feature of interest in the IHC assay may be correlated with the anatomical or micro-anatomical feature based on the application or projection of the mask onto the IHC assay, or the projection of the IHC assay onto the mask. The projection comprises transferring information about the identified regions as a layer onto another slide. A layer or mask may include region identifications of anatomical structures in the form of labels, such as "invasive," "center of tumor," "individual tumor gland," "highly proliferative," "connective tissue."

A plurality of IHC assays may be arranged around one or more anatomical assays placed at a predetermined location, for example, at or near the middle of the arrangement. Such an arrangement enables efficient generation and projection of masks depending on which feature in the IHC is being queried. For instance, the tissue specimen may be a breast tissue intended for diagnosis of a breast tumor. One or more slides of the tissue specimen may be stained with a hematoxylin-eosin (H&E) assay used to identify macro and micro anatomical features of the one or more slides. Adjacent slides from a same tissue specimen or slides from a tissue sample adjacent to or near in proximity to the original tissue sample may be stained with IHC assays intended to identify specific cells or features of interest. It should be understood by one of ordinary skill in the art that the term adjacent slides may refer to a slide from a same tissue sample, bodily part, or composite of bodily parts. For instance, the anatomical feature may be a tumor, with a micro-anatomical feature being a tumor marker or a region of the tumor. The region may be user selectable via an interface, or it may be determined by the system based on biomarkers identified on the slide. The mask may be applied to one or more IHC slides depending on the query, with any features of interest that match the anatomical mask being selected or indicated as appropriate for analysis. Specific examples are provided below with reference to the figures. Moreover, unless otherwise specified, any reference in the present subject disclosure to "assay," "image," and "slide" may be interchangeable with each other, since the inventive systems and methods may be applied to images of slides and assays, with results being graphically depicted based on analyses of these images and the assay data contained therein.

FIG. 1 shows a system 100 for analyzing multiple assays, according to an exemplary embodiment of the present subject disclosure. System 100 comprises a source 101, a memory 110, a processor 125, and a computer 120. Source 101 may be any combination of a staining platform, imaging system, user interface, or network connection to one or more of these elements. Source 101 delivers assay information for a plurality of assays to memory 110 via computer 120. The plurality of assays represent adjacent cuts or slides from a same tissue specimen or slides from tissue sample adjacent to or near in proximity to the original tissue sample intended to be diagnosed or analyzed. A typical specimen is processed in an automated staining/assay platform that applies a staining assay to the specimen, resulting in a stained specimen. Staining assays can use chromogenic stains for brightfield imaging, fluorophores, such as organic fluorophores, quantum dots, or organic fluorophores together with quantum dots for fluorescence imaging, or any other combination of stains, biomarkers, and viewing or imaging devices. A choice of assay depends on the question at hand, and may be selected to highlight an anatomical feature such as a tumor, and/or other cells in a region of or around the tumor. There are a variety of commercial products on the market suitable for use as the staining/assay platform, examples being the DISCOVERY™ XT biomarker platform and the BenchMark™ ULTRA IHC/ISH slide staining products of the assignee, Ventana Medical Systems, Inc. The stained tissue may be assessed by an observer or supplied to an imaging system, for example on a microscope or a whole-slide scanner having a microscope and/or imaging components. The imaging system includes a light source for illuminating the specimen, for example at wavelengths intended to produce a fluorescent response from the stains and biomarkers applied to the assay, or for transmission of light through the stained tissue. The imaging system can further include a camera or detector, for example a CCD or CMOS sensor or spectral camera to capture a digital image. It can also further include an eyepiece or display for viewing by an observer. One example of such a camera is the VENTANA iScan HT® product of the assignee Ventana Medical Systems, Inc., or from companies such as Zeiss, Canon, Applied Spectral Imaging, and others.

Memory 110, which may be internal or external to the computer 120, stores a plurality of processing modules or logical instructions that are executed by processor 125 coupled to computer 120. For instance, a query processing module 111 receives a plurality of assay information and a query from source 101. Besides being provided by source 101 or being input by a user, the information may also be supplied over the network to a network server or database for storage and later retrieval by computer 120. Besides processor 125 and memory 110, computer 120 also includes user input and output devices such as a keyboard, mouse, stylus, and a display/touchscreen. As will be explained in the following discussion, processor 125 executes logical instructions stored on memory 110, performing collection and acquisition of the assay information, processing of image data, processing of the input query, quantitative analysis, and display of quantitative/graphical results to a user operating computer 120. Moreover, as described herein, tissue specimens stained with an assay designed with the disclosed methods can be viewed with a microscope or scanned for analysis and viewing on computer 120 or any other computing device.

As described above, the modules include logic that is executed by processor 125. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 110 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As mentioned above, query processing module 111 receives a plurality of assay information and a query from source 101. The assay information and the query may be received separately or at the same time, from a user interface, from a database, or any combination thereof. The assay information may include, for example, an identification of each assay in the panel, a tissue type, assay properties including stain and biomarker identifiers, features of interest within the tissue intended to be diagnosed and/or associated biomarkers, control parameters of a staining process, presence of pigments, and other physical, morphological, or physiological information. The information about the staining process may further include an identification of a staining and/or imaging platform coupled to or in communication with source 101. For instance, as described above, the specimen may need to be stained by means of application of a staining assay containing one or more different biomarkers associated with chromogenic stains for brightfield imaging and/or fluorophores for fluorescence imaging. The assays may be optimized for the type of diagnosis or analysis in the query provided by source 101. For instance, certain counterstains may be applied universally to the selection of assays comprised by the assay panel provided by source 101.

An anatomical detection module 112 is executed to retrieve anatomical information from an image of an assay. At least one of the slides in the panel may be stained with an anatomical assay, which, in some embodiments, is referred to as a macro-anatomical assay, or a combination of stains and biomarkers intended to identify anatomical structures or features in the slide. For instance, an H&E stain may be used to identify a tumor, location, size, and any additional anatomical information such as the identification and properties of epithelial tissue, connective tissue, blood vessels, lymph vessels and other types of tissue in the environment of a tumor. Moreover, a second slide of an adjacent cut of the tissue specimen may be stained with a micro-anatomical stain, i.e. anatomical information detected at a different scale than macro anatomical structures in the first anatomical assay. For instance, the second assay may be used to identify characteristics about the tumor at hand, such as tumor markers, etc., enabling analysis of a tumor micro-environment. The micro-anatomical assay may further identify a presence of specific structures within the tumor, such as necrosis, stroma, microvessels, individual glands, etc. In other words, the micro-anatomical assay provides additional detail about a part of a first anatomical assay. When a micro-anatomical assay is used, the first anatomical assay is typically referred to as macro-anatomical assay. Identification of particular anatomical feature or structure may be indicated by the query, by a separate user interface, or may be automated.

Moreover, an automated structure detection may be performed, and used to commonly register slides that have similar anatomic structures. Such a registration process may be performed by slide registration module 113, and is further described in commonly-owned and U.S. Provisional Patent Application 61/781,008, the contents of which are hereby incorporated herein in their entirety. Briefly, the assays/slides are arranged on a grid, and annotations are transferred from one slide to another adjacent slide on the basis of matching tissue structure or features. Such a cross-image annotation and tissue-structure based registration provides an anatomical standard that may be used to generate masks and evaluate IHC assays adjacent to the anatomical assays as described herein. Further, a common stain may be used for commonly registered images to enhance detection of tissue structures and features. For instance, Hematoxylin renders every cell nucleus blue, and adding Eosin depicts proteins as red. Other stains may be added to adjacent IHC slides to show independent information in addition to the H&E stain. Each cut is typically fixed on a single slide, but multiple cuts may be fixed in a single slide. Adjacent cuts of the tissue specimen are typically ~5 microns apart, with the distance between adjacent slides being smaller or greater.

The images of the assays may be arranged by slide arrangement module 114, with any slides optimized for providing macro-anatomical and micro-anatomical information being placed in the middle, or approximately in the middle. On either side of these can be arranged subsets of assays representing specialized information or features of interest, such as IHC staining for gene or protein expression in tumor cells or to identify populations and sub-populations of macrophages, lymphocytes, microvascular structures, etc. This creates a stack or arrangement of adjacent slides, as further shown in FIG. 2. In this stack, the order of slides is the same as the order with which the tissue sections were cut from the tissue block that is analyzed. The tissue sections are typically obtained by consecutive cuts from a tissue block and mounted onto the stack of slides. The content of these assays depends on what is being queried, or the type of diagnosis or analysis intended to be performed on the tissue specimen. The registration of the slides may be dependent on the slides selected to be in the center, or the slide selected to be the reference slide or base slide, i.e. the anatomical slides. Since tissues are generally complex 3D objects, with slides taken from sections very close together being reasonably similar, arranging a reference slide close to a center of a stack, such that no slide is too far away from the reference slides, enables proper registration and useful mapping of anatomical masks. As a result, a target region can be localized on all slides, even in the presence of varying mounting location, direction, tissue deformation, and partial tissue damage. Typically, anatomy will slightly change between slides. All slides may be registered directly to an anatomical slide, or each slide may be registered to its neighboring slides, and registration results and masks are propagated from slide to slide. This propagation of registration results may begin with masks defined on the anatomical slides. These are propagated in both directions to slides with tissue sections that were obtained above and below the tissue section stained with the anatomical assay. It may also begin with features on one or more slides, for example, IHC slides that are propagated towards one common anatomical slide.

Mask generation module 115 is executed to identify and/or define tissue regions of interest, macro/micro structures, etc., with the resultant mask being projected to adjacent IHC slides and/or a common anatomical slide to identify features of interest based on the anatomical context. The common registration between an anatomical assay and an IHC assay may be established by detecting common anatomical features in both assays. The mask may comprise one or more macro-anatomical features, regions or such features being present or absent, or micro-anatomical features of a macro-anatomical feature. A mask can for example be defined as regions on the slide where a local feature like a staining response, the texture of a staining response, or a combination of multiple staining responses and textures of staining responses are present or absent. In another example, a mask can be defined based on the geometry of the tissue on the slide. For example, if the tissue of the slide is a lymph node, the mask might identify a primary lymphoid follicle, a paracortical area, a germinal center, a secondary lymphoid follicle, the cortex or other regions that are defined by a lymph node anatomy. Staining responses, the texture of staining responses, and geometric information can be combined to create a mask. The micro-anatomical feature may be determined by a second anatomical assay. Alternatively or in combination, anatomical or micro-anatomical regions may be selected and defined via a user interface.

Mask projection module 116 projects the mask onto images of adjacent IHC assays and/or a common anatomical slide, enabling analysis of specific sub-sets of the IHC assays using macro and micro anatomical information. Such a projection depicts the specific features of interest in the IHC assay in light of the anatomical context provided by the anatomical assay and in spatial relation to other IHC assays. Feature detection module 117 detects one or more features of interest in the image of the IHC assay based on the query, along with their locations in the IHC assay at hand. Feature correlation module 118 correlates the location of the features of interest with the anatomical or micro-anatomical context of the mask, depending on the query or question at hand. For instance, any features that fall within an outline of a feature or micro-anatomical region may be marked for analysis, with any features not matching the mask being ignored. As an example, the anatomical information in the mask may identify a tumor, a muscular tissue, and a lymphatic tissue. Micro anatomical information may further identify proliferative regions, stroma regions in the tumor, and necrotic regions in the tumor. An adjacent IHC assay may be queried to retrieve numerous immune cell biomarkers. Feature detection module 117 analyzes the IHC assay, and feature correlation module 118 correlates any detected biomarkers with the anatomical context provided by the mask, and isolates/tags specific immune cells that are found to exist within the tumor or regions of the tumor (as identified by the IHC assay). The feature detection module can for example include a nucleus detector when the biomarker of interest is a nucleus stain, a cytoplasm detector when the biomarker of interest is a cytoplasmic stain, or a cell membrane detector when the biomarker of interest is a membrane stain. Detected features can be the presence of absence of such stained structures, or the intensity, texture, or other properties of a staining response in such a detected structure. With additional adjacent IHC slides, the anatomical context provided by the mask may remain the same or varies slightly, depending on what is contained in the query. Consequently, the spatial relation of different analysis results together enable a determination of where in the tumor the markers exist and features like intensity, shape and/or texture of the marker presence as determined by feature detection module 117, enabling a multi-faceted perspective prior to making a diagnosis or prognosis. Moreover, this spatial relation and feature correlation may be applied to a subset of markers, depending on the type of diagnosis to be performed. Such automated detection, registration, and correlation cures the problems of the manual approach identified above. In addition, based on extracted features, predefined or learned models may be referred to for interpreting various image structures as cells, glands, etc., and obtaining an automatic understanding of the various units of macro and micro anatomical information present in the image. Such an automatic understanding can be created top-down or bottom-up using information from multiple registered slides (macro-anatomical and one or more micro-anatomical slides), or using results of such a scene analysis as masks for an analysis of IHC slides. For instance, in a bottom-up approach, first features including presence of absence of a staining response, the intensity, texture, or other properties of a staining response are extracted from one or more registered slides. Local patterns of such features are interpreted by detection methods to indicate the presence and location of nuclei, cells, and other small-scale biological objects. Using predefined rules or learned models regarding the organization of such structures, the objects can be successively grouped into larger objects. For example, on a first level, nuclei or cells can be organized into islets, crypts, epithelium or glands. On a second level, glands in dense neighborhood surrounded by islets can be grouped into a solid tumor with an invasive margin around it, or different layers of epithelium and crypts or glands can be grouped into anatomical areas of an organ. In a top-down approach, predefined rules or learned models define the appearance and geometry of a large-scale biological structure. Here, the appearance can again be defined as presence or absence of staining, the intensity, texture, or other properties of a staining response, this time determined for a larger region, optionally analyzed at a lower magnification. Detection methods may determine a location, an outline, and a geometry of an organ, a tumor, or other biological object that is than successively decomposed into smaller objects. In this decomposition, different detectors for different structures (e.g., crypts, glands, epithelial layers, etc.) can be applied to different regions on the slide using predefined or learned models of their composition. Glands, epithelial layers, crypts etc. may further be decomposed down to individual nuclei or cells that are assigned to the bigger biological structures that they compose. On any given level, biological objects or groups of biological objects (for example cells, crypts, islets, glands, epithelial layers, regions in an organ) may be selected to create a mask that feature correlation module 118 can use to correlate the location of the features of interest with the anatomical or micro-anatomical context of the mask.

Figure 2:
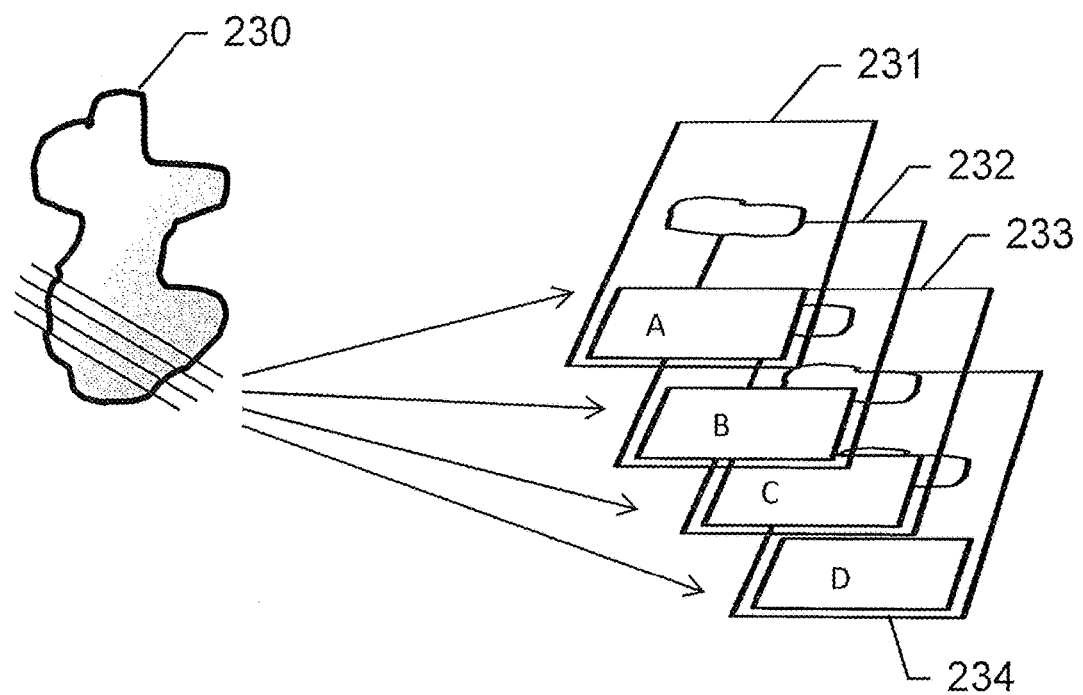
FIG. 2 shows an assay panel comprising multiple slides of a tissue specimen, according to an exemplary embodiment of the present subject disclosure.

FIG. 2 shows an assay panel comprising multiple slides of a tissue specimen, according to an exemplary embodiment of the present subject disclosure. The tissue specimen 230 is cut into four sections, each of which is mounted onto a slide. Slides 231, 232, 233, and 234 therefore depict adjacent cuts of tissue specimen 230. Each slide may be stained with a specific assay, depending on the analysis to be performed. For instance, tissue specimen 230 may be a biopsy of a potential cancer patient, with the analysis being to determine characteristics about various features of the tumor and surrounding tissue, enabling a medical professional to make an accurate diagnosis. In such a case, slide 231 may be stained with an appropriate biomarker for identifying immune cells such as lymphocytes. Slide 232 may be stained with an H&E assay to identify macro-anatomical structures and features such as muscle tissue, connective tissue, and of course the tumor intended to be diagnosed. Slide 233 may similarly be stained with an assay containing along with other biomarkers such as tumor markers. Slide 233 may be intended to produce an image depicting micro-anatomical structures in addition to macro-anatomical structures identified on slide 232. Slide 234 may be stained with another IHC assay, intended to identify, for instance, macrophages associated with the tumor. Slides 231-234 may be mounted with ~5 µm slices of tissue specimen 230 and, therefore, contain similar if not identical anatomical structures. Whereas the prior art would evaluate each assay individually or, at best, in a qualitative anatomical context, the disclosed registration, mask projection, and feature correlation methods described herein enable these and more complex analyses. For instance, a single anatomical slide may provide an anatomical context for a plurality of rich multiplex assays, or for several independently-stained assays of the tissue specimen.

Figure 3A:
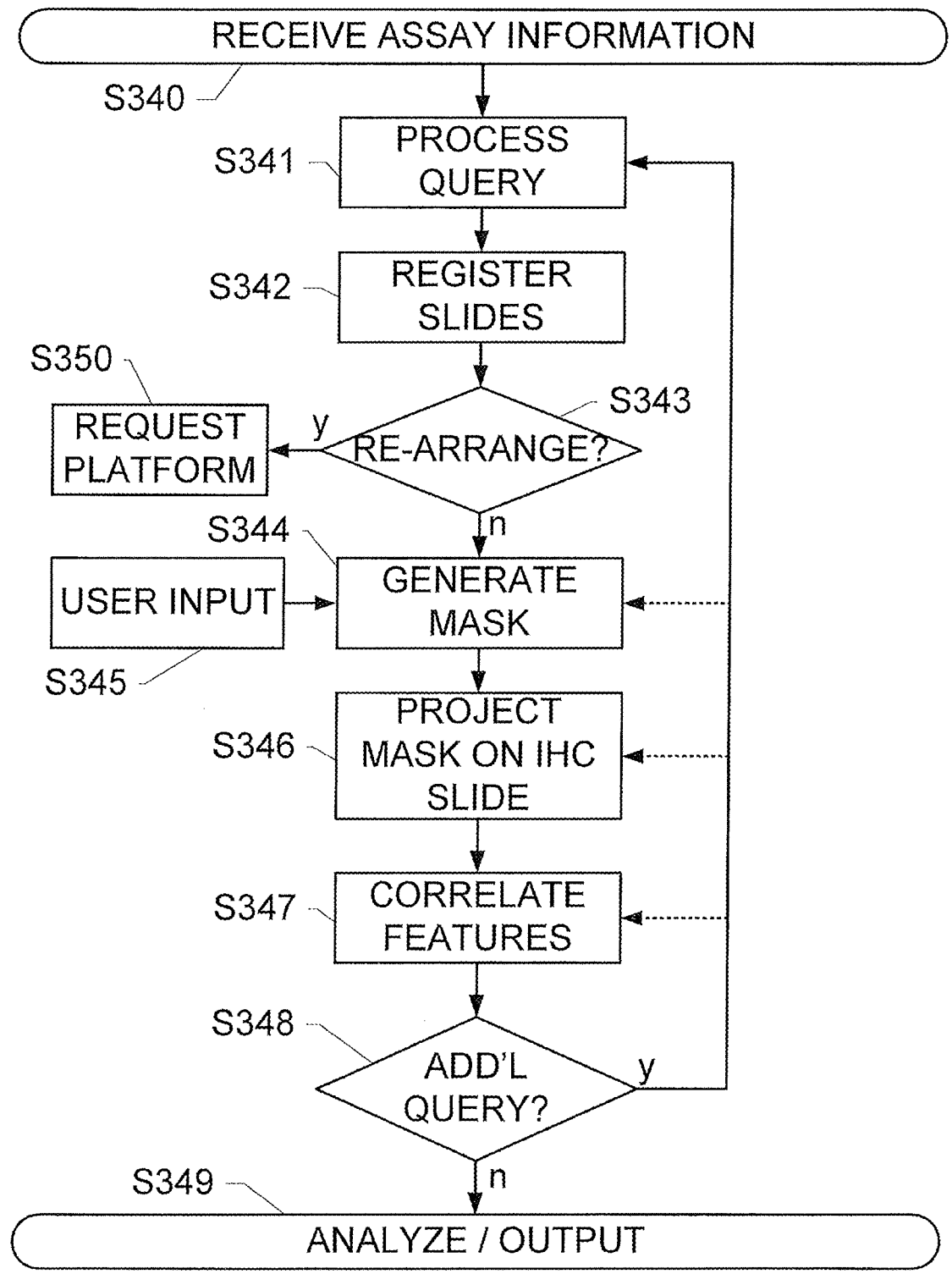
FIGS. 3A and 3B show methods for analyzing multiple assays, according to an exemplary embodiment of the present subject disclosure.

FIG. 3A shows a method for analyzing multiple assays, according to an exemplary embodiment of the present subject disclosure. The method of FIG. 3A may be performed by computer executing modules similar to those depicted in FIG. 1. The method begins with receiving (S340) a plurality of assay information and a query from source 101, such as a staining platform, imaging system, network, user interface, etc. The query may include, for example, one or more requests for the identification and/or quantitation of features of interest, such as IHC staining for gene or protein expression in tumor cells or the presence and spatial relation of immune cells. The assay information may include an identification of each assay in the panel, a tissue type, assay properties including stain and biomarker identifiers, features of interest within the tissue intended to be diagnosed and/or associated biomarkers, control parameters of a staining process, presence of pigments, and other morphological, physical or physiological information. The information about the staining process may further include an identification of the staining and/or imaging platform used to generate the assay panel. For instance, as described above, the specimen may need to be stained by means of application of a staining assay containing one or more different biomarkers associated with chromogenic stains for brightfield imaging or fluorophores for fluorescence imaging. The query may be processed (S341) to determine one or more of a plurality of processes such as how to register slides, arrange slides, or to select one or more subsets of slides for analysis. For instance, the query may include an indicator of what features of interest and/or associated biomarkers are requested by the application at hand. The query may simply request a stage of a tumor, or a specific type of immune cell, with the additional method steps being executed in accordance with the query. Query processing S341 may occur early in the method, or later, or at any time in between. Similarly the remaining method steps need not occur in any particular order, and are only shown in this order as an example embodiment. Persons having ordinary skill in the art may reposition any of these steps in any order in light of the subject disclosure.

A registration of the slides is performed (S342), to link or commonly register slides that have similar anatomic structures. Such a registration process is further described in commonly-owned and U.S. Provisional Patent Application 61/781,008, the contents of which are hereby incorporated herein in their entirety. This cross-image annotation and tissue-structure based registration provides an anatomical standard that may be used to generate masks and evaluate IHC assays adjacent to the anatomical assays as described herein. A common stain may be used for commonly registered images to enhance detection of tissue structures and features. The slide registration may further be based on an anatomical detection from at least one of the slides in the panel stained with an anatomical assay, such as an H&E assay. This assay may be used to identify macro and micro anatomical structures, such as a tumor and its properties, identification and properties of other types of tissue, etc. An additional assay may be determined as identifying micro-anatomical information detected at a different scale than macro anatomical structures in the first anatomical assay, such as tumor markers, etc. Adjacent IHC slides may be commonly registered with the anatomical slides by identifying similar anatomic structures in the IHC slides. The registration of two slides can be performed context-independently using all morphological structures that appear on a pair of slides, or it can be performed context-sensitive only for selected structures and limited to tissue regions on a mask. A context-independent registration process may have already been performed prior to receiving the assay information (S340) and the registration results may simply be included in the assay information. Alternatively, the registration process may be performed context-sensitive based on the results of query processing (S341). For example, multiple slides with different assays may be obtained from a brain of a small animal such as a rat, with every slide being registered to an atlas (i.e. an ideal image of the rat brain) independent of any other slide in the assay, and masks being transferred from one slide to any other by first transferring them to the atlas image, and from there to any other slide. In another example, slides from a tumor patient may use context-sensitive registration, with each slide being registered solely to the anatomical slide in the center of a stack of slides, without any atlas for representing the geometry of the patient's tumor.

In either case, if the anatomical slides are not optimally cut and sliced, or if the registration (S342) results in a physical or anatomical neighborhood of IHC slides to an anatomical slide that is not feasible for the query at hand (e.g., the query cannot return suitable results based on the current arrangement of slides that have been stained), then a new arrangement may be determined manually or automatically by an algorithm in accordance with the present invention (S343), and a request for such new arrangement may be sent (S350) to a staining platform or user associated with the staining platform (for example, a request to stain the slides in a different order to capture a relational aspect between features that could not be determined in the current staining order). The arrangement of slides defines the order of consecutive tissue sections that are mounted on slides and stained with different biomarkers. A change of the arrangement results in a different succession of stained tissue sections. As tissue sections close to each other are more similar than tissue sections that are further apart in this arrangement, a change of the arrangement therefore influences which slides are very similar to an anatomical slide, and which slides are less similar. For example, a mask might identify a set of islets of tumor cells in the invasive margin of a tumor. These islets might only be contained on slides that are in close vicinity to the anatomical slide that was used to create the mask. Context-sensitive registration for these islets is not feasible for slides that are so far away from the anatomical slide such that the islets are not contained on these slides or have changed too strongly in size, shape, and location for a meaningful transfer of the mask onto this slide. For such cases, a preferred arrangement would have slides where features are detected and correlated to this mask as close as possible to the slides where this mask is defined. A given query and set of assays can result in one or more of these constraints that are met with a different arrangement of slides. A determined arrangement of slides may be communicated to staining instruments, laboratory equipment, and laboratory personnel, for example by using a networked laboratory information system. For instance, laboratory information systems are available to, for example, electronically communicate staining protocols, provide labels to slides during mounting (i.e. moving a slice of tissue onto a slide) etc., to a staining platform prior to cutting and slicing the tissue specimen. An ideal arrangement would place macro-anatomical slides close to micro-anatomical slides and subsets of assays representing specialized information or features of interest, such as IHC assays for gene and protein expression in tumor cells, populations and sub-populations of cells like macrophages and lymphocytes, microvascular structures, etc., close to the micro-anatomical slides that define the masks for the analysis of these features of interest. As masks can be propagated by registration to slides above and below a reference or base slide, this typically places macro-anatomical slides between micro-anatomical slides if there is more than one micro-anatomical assay. Similarly, if there is more than one slide with features of interest using a mask from a micro-anatomical or macro-anatomical assay, then the anatomical slide is again placed between the slides with features of interest. Slides with features of interest being arranged around the anatomical slides are depicted in FIG. 2. Different optimal arrangements might be determined depending on a query, the geometry of the examined tissue, and the properties of the cutting process. If the arrangement is determined to be proper, i.e. the current arrangement is feasible for the query at hand and a re-arrangement (S343) is not required, then the method continues.

A mask is generated (S344) to identify and/or define tissue regions of interest, macro/micro structures, etc. on one or more anatomical slides. The mask may be generated based on a user input (S345), based on results of query processing (S341), based on automated anatomical feature detection of registration (S342), or any combination of these. In some embodiments, the mask may be determined by detecting common anatomical features in an anatomical assay and an IHC assay depending on the specific query. In either case, the mask may comprise one or more macro-anatomical features, regions identified by the presence or absence of these features, micro-anatomical features determined inside or in the neighborhood of these macro-anatomical features, and/or regions determined by the presence of micro-anatomical features. For instance, the mask may comprise an outline of a tumor gland, presence of muscle or connective tissue, identification of cells, or regions/characteristics of each of these features. Micro-anatomical features such as tumor markers, etc., may be automatically detected and added to the mask, or selected and defined via a user input (S345).

The mask may be projected (S346) on one or more images of adjacent tissue sections, for example, images of adjacent tissue samples that have been subjected to IHC assays, to enable analysis of features of interest in the IHC assays based on the macro and micro anatomical information contained in the mask. This mask projection may also be indicated on a graphical display or output, enabling a physician or other medical professional to qualitatively and/or quantitatively analyze the features of interest in light of the anatomical context provided by the mask. The projection enables a feature correlation (S347) including detecting one or more features of interest in the IHC assay based on the query, and correlating the location of these features with the anatomical context provided by the mask. For instance, any features that fall within an outline of a feature or micro-anatomical region, such as immune cells within a tumor, may be marked for analysis. Masks may be extended or shrunken to include or exclude features in the neighborhood of objects identified by the mask. Features not matching the mask may be of interest or may be ignored. Structures in the projection region may be automatically detected as being of interest. Moreover, such mask projection enhances automated processing by identifying common tissue or regions of tissue on different slides, according to a chosen mask, and by combining image information from multiple slides.

Depending on the query, or whether any additional biomarkers are to be queried (S348), the method either returns to a query process (S341) to allow the selection of a different set of biomarkers, mask generation (S344) to identify different regions that are analyzed for the already selected biomarkers, mask projection (S346) to identify corresponding regions of the mask on all slides that contain the queried biomarkers, or feature retrieval (S347), which computes and reports the presence and relationship of the queried biomarkers and masks. For instance, an additional query of an immune cell outside the tumor may be performed simply by retrieving these additional features (S347), while a query using a micro-anatomical context may require the method to perform a new mask generation (S344). As mentioned herein, any combination of these steps is possible, depending on results of the query process (S341). If there are no additional queries, the results of the feature correlation (S347) are output for analysis and/or visually depicted (S349).

Figure 3B:
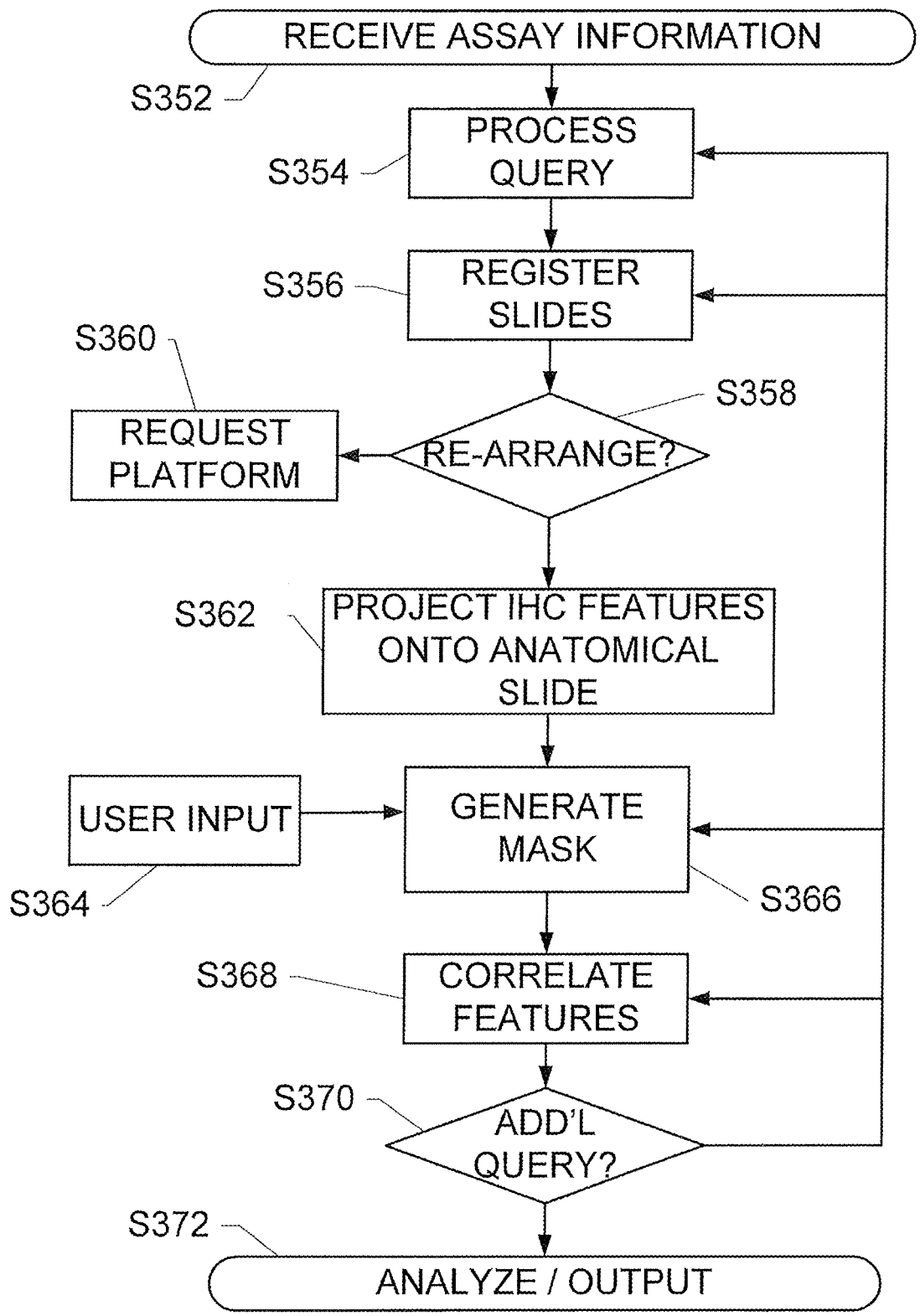

FIG. 3B shows a possible re-arrangement of the steps in FIG. 3A. In step s352, assay information is received. After the assay information is received, a query may be processed on the assay information (S354), slides may be registered (S356), a mask may be generated (S366), or features may be correlated. If the slides are registered, the slides may be re-arranged in S358. In S360, an inquiry as to whether the slides should be re-arranged may be sent to staining platform or other user of the method shown in FIG. 3B. In S362, features, for example, IHC features, are projected onto an image of an anatomical slide, for example, an H&E slide. A user may then request in S364 that a mask be generated (S366) of the image that contains the IHC features projected onto the anatomical slide. If a mask is generated in S366, image features present in the mask or the image of the IHC features projected onto the anatomical slide may be correlated (S368) and additional queries may be processed on the mask or the image of the IHC features projected onto the anatomical slide, before an analysis is outputted (S372) to, for example, a user interface. Here, step S362 is executed before the mask generation S366. In this step (S362), the registration information from step S356 is used to project the features from all IHC slides, including micro anatomical information, when available, onto one common macro anatomical slide. The mask generation S366 can now make use of macro anatomical features, micro anatomical features, and local tumor properties like "proliferative", "necrotic", etc. Features from all slides can be correlated (i.e. compared to other features in the generated image) in S368, as the features have been projected onto one common slide.

Figure 4A:
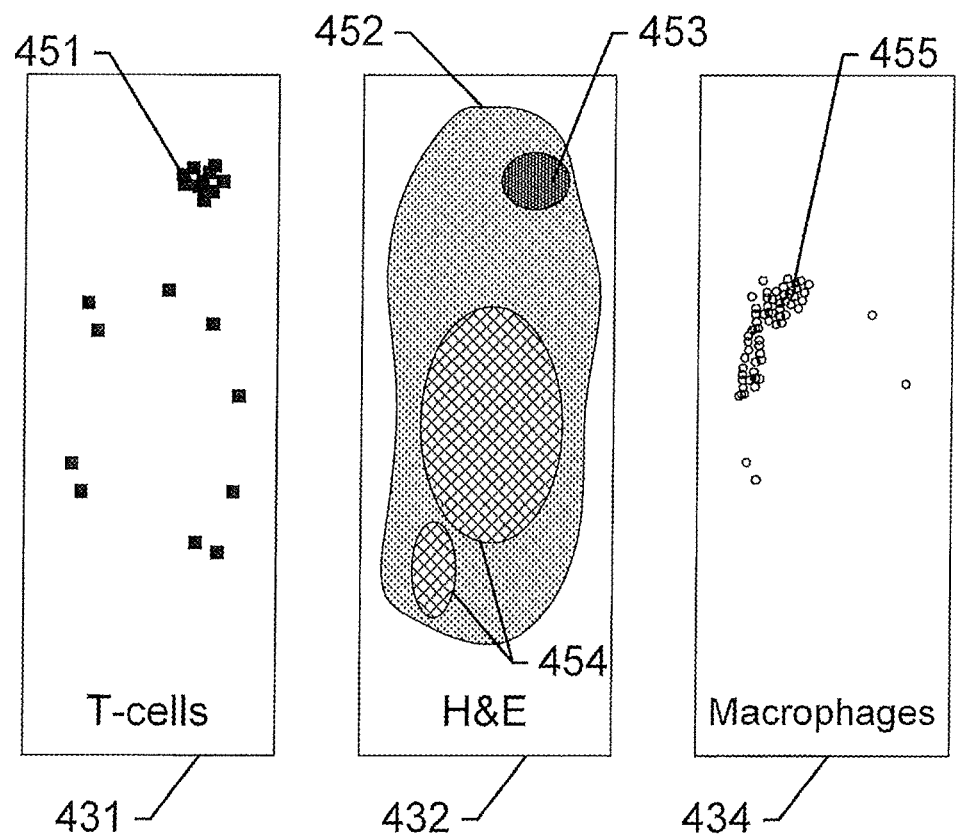
FIG. 4A-C show arrangements of slides in an assay panel, according to an exemplary embodiment of the subject disclosure.
Figure 4B:
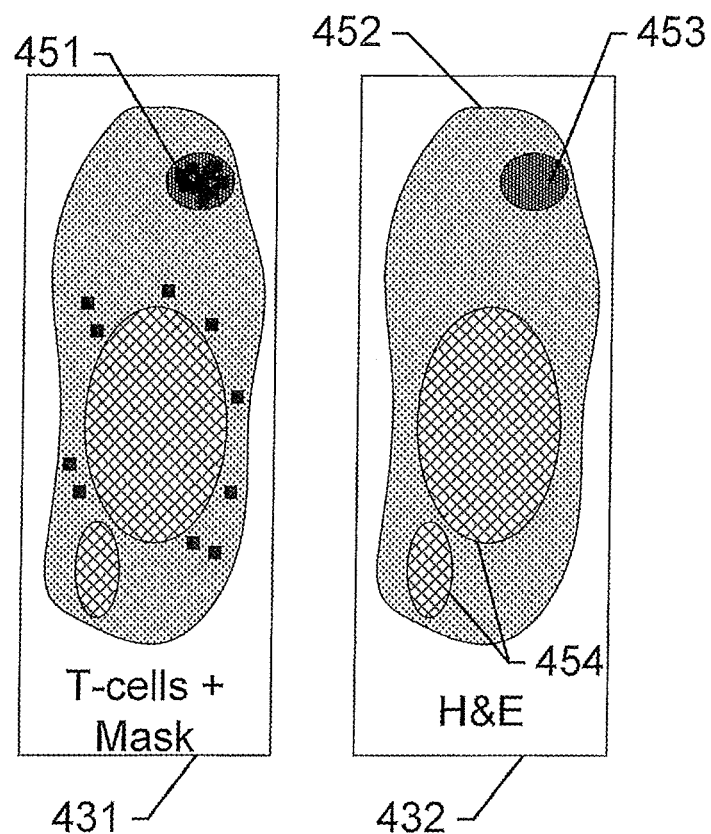
Figure 4C:
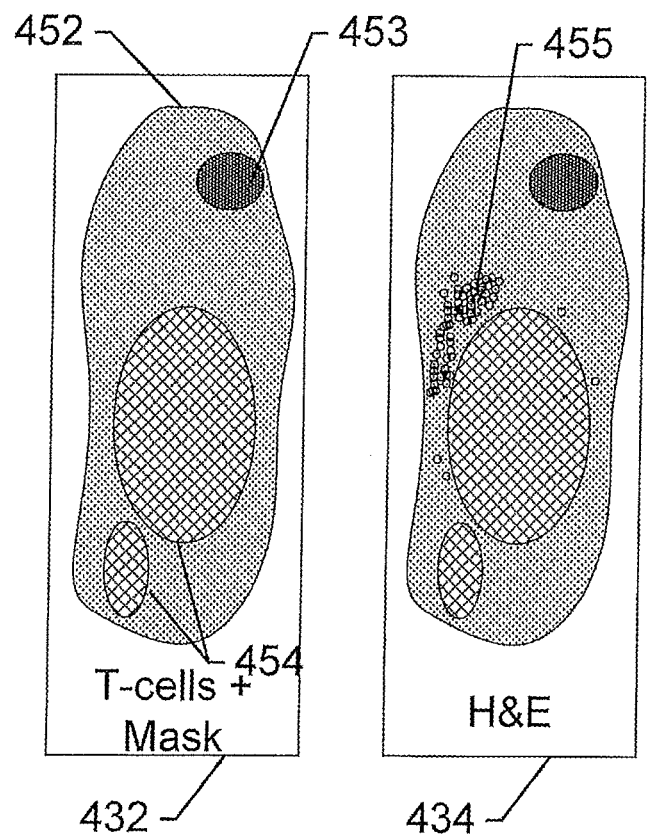

FIGS. 4A-C show arrangements of slides in an assay panel, according to an exemplary embodiment of the subject disclosure. Similar to the assay panel of FIG. 2, the present assay panel comprises slides 431, 432, and 434, each one stained with a different assay intended to highlight a different feature. In the present example, slide 431 is stained with an IHC assay that depicts immune cells 451. Likewise in slide 434, IHC biomarkers for tumor-associated macrophages 455 are shown. Meanwhile, slide 432 is stained with an H&E marker and is arranged between the two IHC assays. Slide 432 may therefore be considered an anatomical slide, depicting an outline and shape of a muscle tissue 452, a lymph node 453, and tumor glands 454. The different textures for the different cell types are shown here for clarity purposes, and in real life may comprise stain and counter-stain combinations for depicting cell nuclei, membranes, etc. Moreover, IHC slides 431 and 434 do not depict anatomical shapes 452, 453, and 454, and are not expected to display much more than their respective queried biomarkers 451 and 455. Slide 432 clearly depicts macro-anatomical 452 and micro-anatomical 454 features, which are extracted to generate a mask that is projected onto the IHC slides 431 and 434 to provide anatomical context for analysis of the respective features of interest. Both immune cells 451 and macrophages 455 are different types of cells, and both of are prognostic for tumor growth. Where in a conventional system, an analysis of each of assays 431 and 434 would be flawed without any anatomical context, the inventive systems and methods described herein enable an accurate count/location determination of these features of interest, and therefore a reliable diagnosis of the tissue specimen. In other words, relevant features from the detected structures of interest are paired with an anatomical context provided by a different stain applied to a commonly registered parallel slice of tissue (ensuring that the parallel slices can be suitably compared) improves automated image analysis and highlights features of interest, for example, anatomically significant features of interest, such as macro- or micro-anatomical features of interest, which may otherwise not be visible or detectable in, for example, an image of a tissue section stained with a multiplex assay or an image of an individually stained tissue section. Such pairing also enhances feature detection on any individual slide.

For instance, FIG. 4B shows slide 431 having been overlaid with a mask extracted from anatomical slide 432. Slide 431 now clearly depicts macro-anatomical and micro-anatomical features that provide anatomical context for analysis of the respective features of interest. For instance, it is now clear that immune cells 451 are predominantly clustered within lymph node 453, with a few immune cells 451 dispersed around a perimeter of tumor gland 454. It is also known that immune cells are typically densest within the lymph nodes that produce them. Consequently, a feature correlation described herein would determine a count of immune cells in slide 431 that ignores the immune cells within the region of lymph node 453. The feature correlation module reports the presence of absence of features on a slide on masks that have been transferred onto this slide from anatomical slides. This enables a more precise count of the immune cells that are near tumor gland 454 and, therefore, a more reliable diagnosis.

Similarly, FIG. 4C shows slide 434 having been overlaid with a mask extracted from anatomical slide 432. Slide 434 now clearly depicts macro-anatomical and micro-anatomical features that provide anatomical context for analysis of the respective features of interest. For instance, it is now clear that tumor-associated macrophages are predominantly clustered around the top left area outside tumor gland 454. It is also known that high numbers of tumor-associated macrophages typically indicate an invasive front of the tumor gland. Consequently, a feature correlation described herein would determine that the top left region of tumor gland 454 is the invasive front, and an appropriate diagnosis can be made to target this region of the tumor gland. Also, any number or variation of slides may be combined, with features from a multitude of IHC-stained slides being reported and interpreted together by collecting the presence and features of the staining on masks that have been transferred from one anatomical slide to each of the IHC slides or features of the staining from a multitude of IHC-stained slides that have been transferred from each of the IHC slides to one anatomical slide.

Although the selection of stains and biomarkers may be specific to the clinical question at hand, similar to a multiplex approach, these methods can also be applied to analysis of independent assays that, if applied to a multiplex assay, may provide conflicting or ambiguous results. Moreover, the automated correlation of independent adjacent slides enables more detailed analysis of several cell types beyond the examples depicted in the figures. For instance, immune cells within a tumor can be identified by processing an image of an IHC assay with the anatomical context retrieved from an anatomical assay. With additional adjacent slides, the anatomical contexts remain the same or vary only slightly. Alternatively or in addition, an evaluation of another IHC slide based on anatomical context may determine a smaller number of immune cells within a tumor region as compared to immediately around the tumor. Consequently, the immune cell counts may be more consistent, as opposed to other methods that identify an area (e.g., the tumor) for analysis individually and independently in images of slides of adjacent or non-adjacent tissue sections, which have been subjected to different stains or assays. Detailed knowledge about whether the immune cells are just outside the tumor gland or have entered the tumor gland may be reliably queried. Boundaries between tumors and other structures such as lymph nodes may be clearly identified.

A mask may be generated from more than one anatomical assay. For instance, an IHC marker may target cell membranes of tumor cells, enabling the mask generation module to identify tumor glands, isolated tumor cells, characterize tumor cells as proliferative, etc., enabling identification and analysis of tumor regions vs. other regions and appropriately processing remaining IHC images. Therefore, several independently stained adjacent slides of a particular tissue specimen may be evaluated using one or more anatomical contexts depending on the application at hand. The multiple slides may be used to compile analysis results that are far more detailed and accurate than those achieved by conventional methods.

As described above, micro and macro-anatomical structures may be automatically detected based on the query and assay information. Further, a user interface may be provided enabling a user to indicate a micro anatomical preference simply by zooming in on the macro anatomic slide. The micro-anatomical detection is an optional step, and masks may be created based solely from a macro-anatomical slide. Depending on the features from slides used for mask creation, the surrounding IHC slides may be sorted or arranged automatically as a function of the queried features of interest, the assay information, and the question at hand. The order of slides can be requested from or recommended to staining platforms, other laboratory instrumentation and laboratory staff to stain new tissue sections accordingly.

The subject disclosure therefore provides methods for optimizing complex assay analysis based on common registration and mask-based feature detection. The operations described herein may be executed by a single logic unit, or a plurality of logic units. For instance, a data collector may be used to obtain and parse assay information, a data extraction may be used to retrieve relevant information from raw image data, and a data visualizer may be used to generate and depict optimal IHC assays with anatomical contexts provided by masks. The separate modules may work together to provide recommendations to a user prior to making a diagnosis. Moreover, besides medical applications such as anatomical or clinical pathology, prostrate/breast/lung cancer diagnosis, etc., the same methods may be performed to analysis other types of specimens such as remote sensing of geologic or astronomical data, etc. The operations performed herein may be ported into a hardware graphics processing unit (GPU), enabling a multi-threaded parallel implementation.

Figure 5:
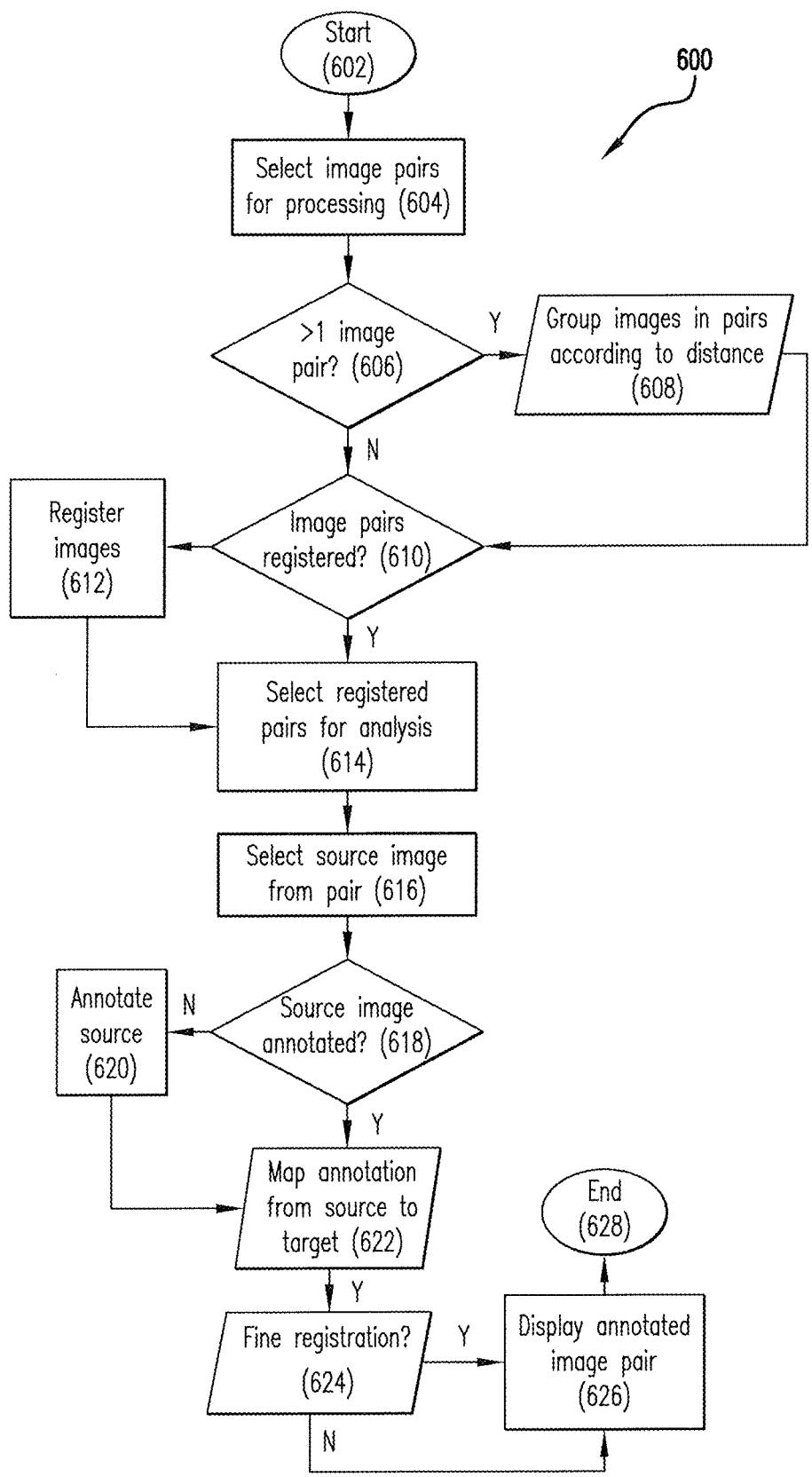
FIG. 5 is a flow diagram illustrating an embodiment of a method carried out by an image analysis software program in accordance with this disclosure.

Image registration, in accordance with the present invention is performed as follows; however, other methods of image registration may be utilized. FIG. 5 is a flow diagram illustrating an implementation of a method carried out by an embodiment of an image analysis software program in accordance with this disclosure. The image analysis software program enables a user to instruct the processor to align selected digital images (e.g. digital images of scanned slides of tissue sections, including whole slide images, partial slide images, or portions of whole or part slide images), annotate one or more of the images, map annotations from one or more images to other images, or combinations thereof. As shown in FIG. 5, the method 600 begins at the start block 602. At block 604, a set of digital images is acquired (e.g. scanned or selected from the database) for manipulation. Each set of digital images includes one or more digital images corresponding to, for example, a tissue section from a set of adjacent tissue sections of a single patient. Each image may be derived from tissue sections that are differently stained, or that are digitized using a different imaging mode, or both, as compared to another image. In some embodiments, the digital images are produced by scanning slides (e.g. microscope glass slides) prepared from adjacent tissue sections.

At block 606, if only a single image pair is selected, the process proceeds directly to block 610. If more than a single pair of images is selected, then the set of selected images is grouped into pairs at block 608 prior to proceeding to block 610. In some embodiments, image pairs are selected as adjacent pairs. Thus, for example, if the set of selected images includes 10 parallel, adjacent slices (L1 ... L10), then L1 and L2 are grouped as a pair, L3 and L4 are grouped as a pair, etc. On the other hand, if information is not available as to which pairs of images are most similar to each other then, in some embodiments, images are grouped according to their distance apart, (e.g., inter-edge or inter-image distance corresponding to the chamfer distance between the H maps of the various images), pairing together images which are closest to one another. In exemplary embodiments of the present invention, an inter-edge/inter-image distance is utilized to pair of images. In some embodiments, edge-based Chamfer distance may be used to compute the inter-image/inter-edge distance. If the pairs of images have previously undergone a coarse registration process, such that the images have been coarsely aligned and the results have been saved, the process advances to block 614. Otherwise, at block 612 a coarse registration process is performed on the selected image pairs. The coarse registration process is described in further detail below.

Passing to block 614, the selected, and now registered (aligned), images are displayed on a common grid, with the images overlaid in a single image, displayed as separate images, or both, on a single monitor or spread across several monitors. At block 616, the client user may select one of the images from a pair of images as the source image. If the source image has already been annotated as desired, the process proceeds to block 622. Otherwise, the client user annotates the source image as desired at block 620. In some embodiments, the annotation is reproduced on that selected image, for example substantially simultaneously with the user inputting the annotation. In some embodiments, the user first identifies a source and target image, and if the source image has been annotated the user proceeds to instruct the program to register the images (for example undergo a coarse registration process). If the source image has not yet been annotated, the user may annotate the source image prior to registering the pair of images. At block 622, which may (or may not) occur substantially simultaneously with block 620, the annotation is mapped to the other image in the pair (the target image) and graphically reproduced on the target image. In embodiments wherein annotation occurs prior to coarse registration, the annotation may be mapped from the source image to the target image at substantially the same time as the pair of images are registered (aligned). Moving to block 624, a fine registration process may be performed to optimize the location of the mapped annotations and/or alignment of the images. The fine registration process is discussed in further detail below. At block 626, the annotated image pair is displayed with the results of the fine registration process (or the annotated image pair may be displayed only with the results of the coarse registration process if fine registration is not used). The method then ends at the final block 628.

Figure 6:
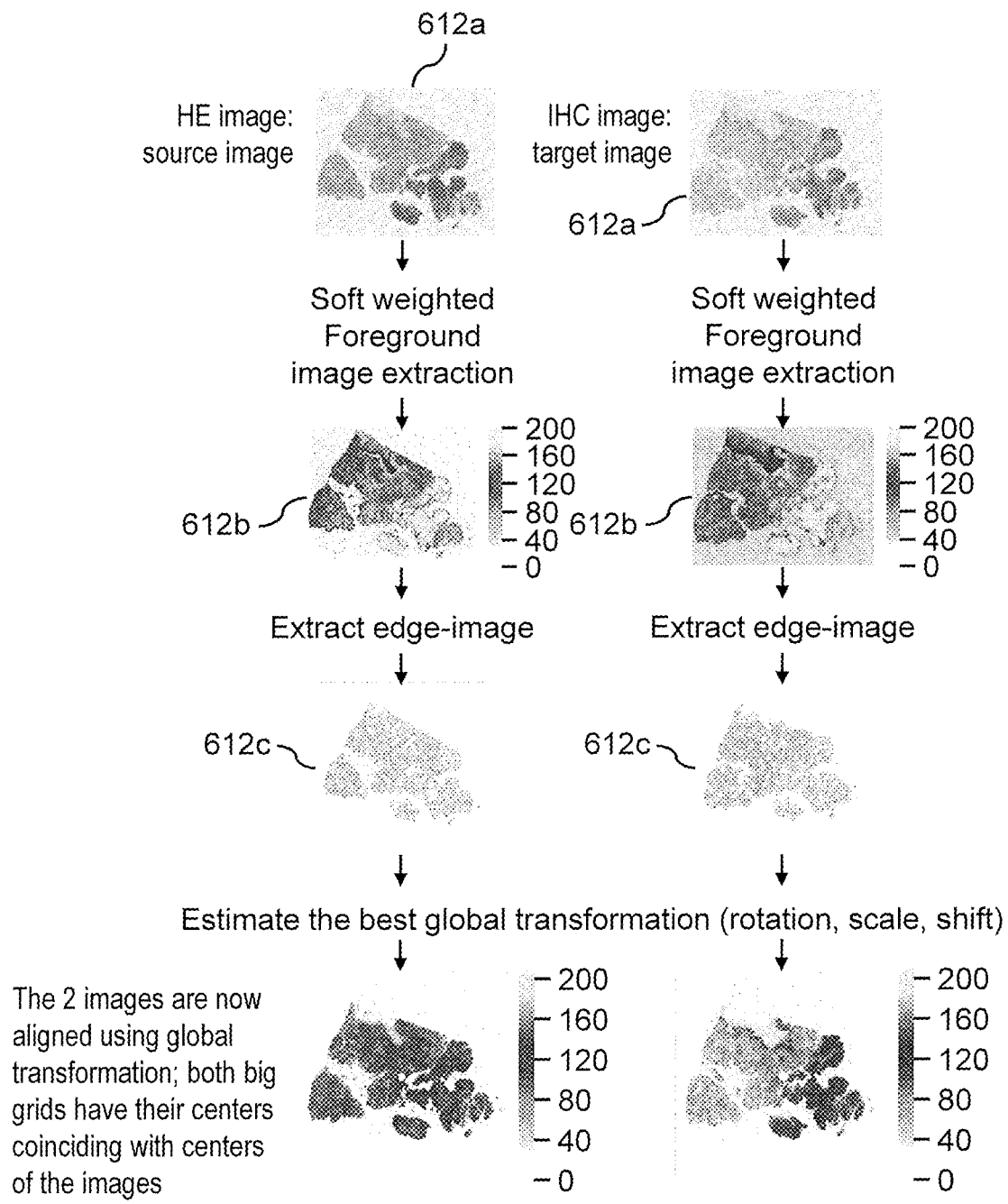
FIG. 6 illustrates the basic steps of an embodiment of a coarse registration process, which may be part of an image analysis program in accordance with this disclosure.

FIG. 6 illustrates further details regarding block 612, the coarse registration process. Prior to initiating the coarse registration process, two images are selected for alignment (block 604, FIG. 5). As shown in FIG. 6, in some embodiments, the coarse registration process, which is applied to the two images, may involve: 1) obtaining a soft weighted (continuous valued) foreground image (also referred to as a 'gray-scale' image herein) from each of the selected images (for example, a source image and a target image) (block 612a, FIG. 6); 2) extracting an edge-image from each of the resultant foreground images (block 612b, FIG. 6); and, 3) computing global transformation parameters (e.g. rotation, scale, shift) (block 612c, FIG. 6) using edge-map based matching and moments information obtained from the soft weighted foreground images. Finally, as shown in FIG. 6, the two images are aligned using the global transformation parameters and may be displayed on a common grid on a monitor (or monitors).

FIGS. 7-11 illustrate further details of block 612a, wherein soft weighted foreground (i.e., images corresponding to a soft weighting applied to the stain images, where higher/lower values denote that a certain stain color is more/less present) are obtained. The soft weighting method is a method for obtaining a continuous-domain valued image from a discrete valued unsigned character image (e.g., wherein the range of the pixel values is 0-255). In some embodiments, the goal of obtaining the soft weighted foreground image is to separate tissue from non-tissue in the digital image and to provide the basis for moment computation from the whole slide, for scaling and translation estimation. In some embodiments, the gray-scale, foreground images are obtained by applying a color de-convolution process to the selected digital images, which may be scans of glass slides prepared from tissue sections which have been stained. The specific color de-convolution process depends on the specific stain, and will be described herein by way of three examples: HE stain, IHC stain and fluorescent image.

Figure 7:
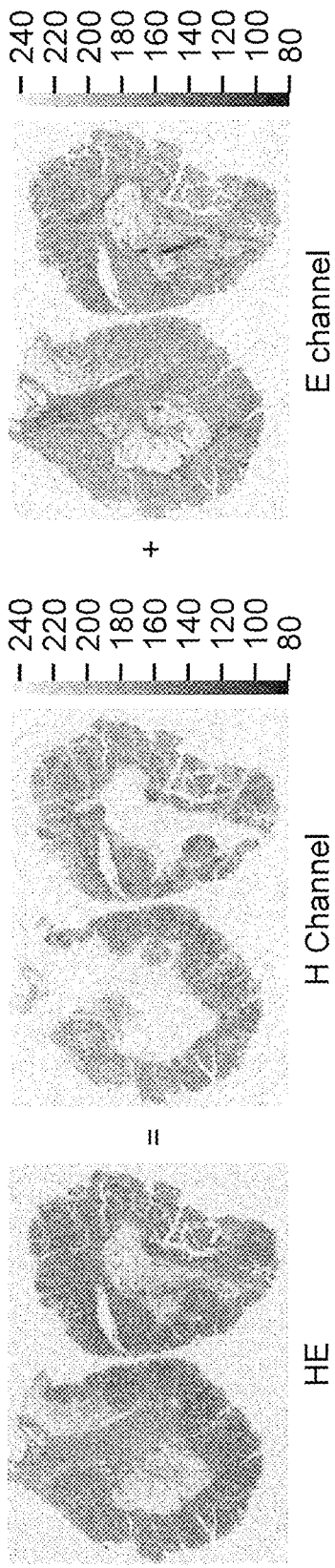
FIG. 7 illustrates further details of one of the basic steps of the embodiment of the coarse registration process of FIG. 6.
Figure 8A:
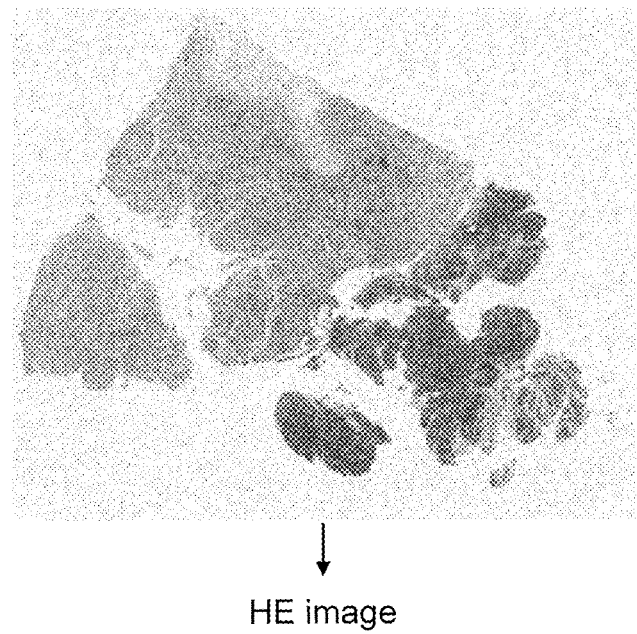
FIGS. 8A and 8B illustrate a HE image and its corresponding soft weighted foreground image.
Figure 8B:
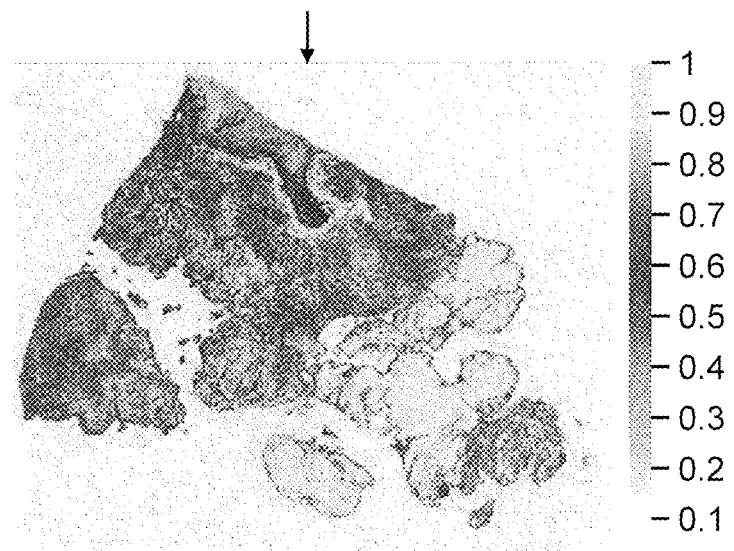
Figure 8C:
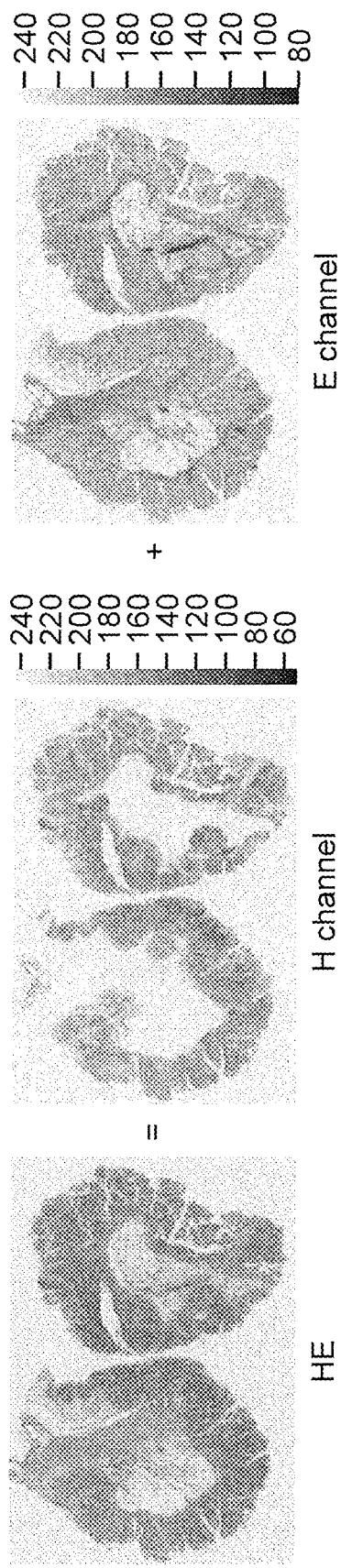
FIG. 8C illustrates an example HE image that was obtained based on corresponding maximum pixel values of H and E channel images.
Figure 9:
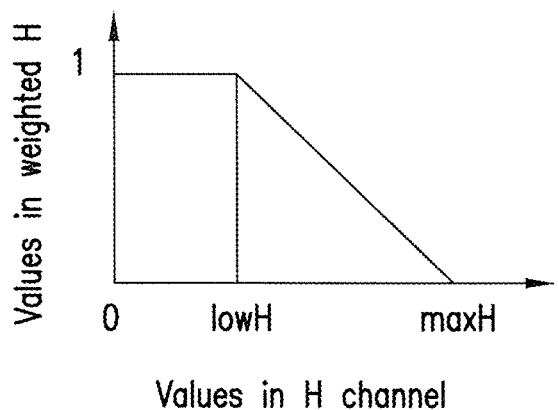
FIG. 9 illustrates an embodiment of the soft weighting process of FIG. 7 for the H channel image of FIG. 8.

FIGS. 7-9 illustrate the soft weighting foreground image extraction process for an HE image. As shown in FIGS. 7-9, the image extraction process is essentially a color de-convolution process, wherein the color stain is removed from the original HE image (FIG. 8A) to result in the soft weighted foreground image (FIG. 8B). The HE color de-convolution can be performed by any method known in the art, for example as described in: Ruifrok A C, Johnston D A, Quantification of histological staining by color deconvolution, *Anal Quant Cytol Histol* 23: 291-299, 2001, which is herein incorporated by reference in its entirety.

FIGS. 7 and 9 together illustrate an embodiment of a process used to obtain the image of FIG. 8B. As shown in FIG. 7, an H channel image and an E channel image are obtained by removing two image components (specifically H (haematoxylin: Blue colored) and E (Eosin: red colored)) which have been mixed/added to form the composite image HE image of FIG. 8a. In some embodiments, after the two (H and E) channels are obtained (e.g. after the color de-convolution process), an OTSU and soft weighting method are performed on each of the H channel image and E channel image i.e., the color channels or stained component extracted from the source image, in this case the H and E image. The OTSU method is a thresholding method used to automatically perform histogram shape-based thresholding and is described, for example, in Otsu, Nobuyuki, "A Threshold Selection Method From Gray-Level Histograms" Automatica 11.285-296 (1975): 23-27, which is herein incorporated by reference in its entirety. The weighted H image (e.g., an image that reflects the stain contribution of the H channel, where the weighted H image has higher/lower values when the stain contribution of the H channel is higher/lower) is obtained after OTSU-based thresholding and soft weighting on the H-channel image. Similarly, the weighted E image is obtained after OTSU-based thresholding and soft weighting on the E-channel image. Finally, the weighted HE image is obtained as follows: each pixel in the weighted HE image=maximum of (H channel image pixel, E channel image pixel), i.e. it is the maximum of the corresponding pixel values in H and E channel images. FIG. 8C illustrates an example HE image that was obtained based on corresponding maximum pixel values of H and E channel images.

FIG. 9 illustrates an embodiment of the soft weighting process for the H channel image. After OTSU-based thresholding is performed, the threshold value (to separate the foreground from the background H channel) is taken as levelH. Accordingly, levelH is the OTSU-based threshold computed on the H channel, lowH is the value of fraction*levelH, and maxH is max(H channel image), i.e. the maximum value of all the pixels in the H channel image. As may be understood from this description, in H and E channels, lower (or higher) intensity values correspond to darker (or lighter) regions in the image; e.g., in the H channel, darker regions denote areas where haematoxylin (blue component) is more strongly expressed. In the final weighted H image, a high value for these darker regions (more blue regions) is expected. Similarly, in the weighted H image, a low value for lighter regions, where the contribution of the haematoxylin is low, is expected.

In some embodiments, the objective is to obtain a weighted H image that is higher in value when the contribution of the blue haematoxylin channel is high, and lower in value when the blue channel contribution is low. In FIG. 9, the fraction term controls how the soft weights are assigned to weighted H image; e.g. when fraction=1, then lowH=levelH, where image pixels where the blue channel contribution (value of H channel) is less than lowH get assigned a value of 1. When the fraction is 1, the weighted H image has non-zero pixel intensity values in the range [levelH, maxH] (where level H represents the OTSU-based threshold computed on the H channel and maxH represents the maximum value of the H channel image). In some such embodiments, for pixel/pixel intensity values in the H channel which are lower than levelH, the weighted H image is assigned a value of 1. For values in the H channel which lie in the range [lowH, maxH], the weighted H values are in the range [1,0]. A range of [lowH, maxH] in the H channel is mapped to a range of [1,0] in the weighted H image. In some embodiments, the fraction is an empirically-chosen value of 0.8. Accordingly, the weighted H image will have values in a wider range of pixel values; often, in fainter image regions, the threshold returned by OTSU may not be accurate and hence, lower values are assigned to the weighted image for image pixels with values slightly higher than the OTSU threshold.

Figure 10A:
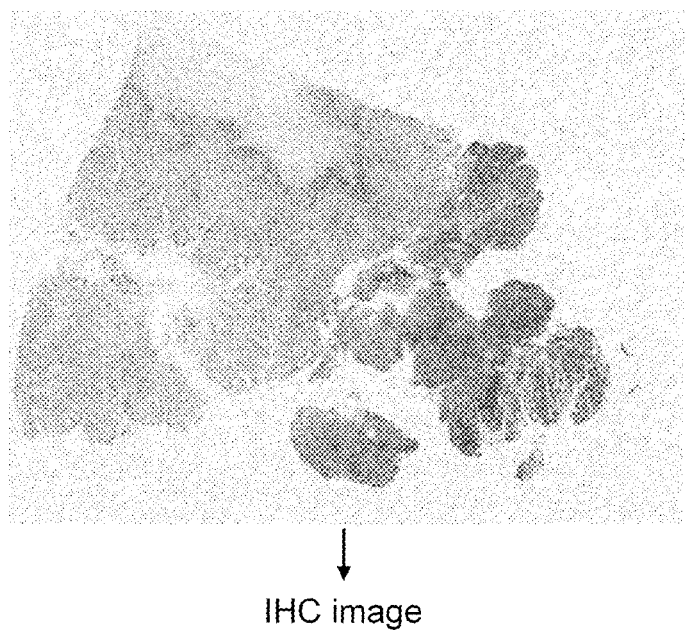
FIGS. 10A-10C illustrate an IHC image and its corresponding soft weighted foreground image, as well as details of one of the basic steps of the embodiment of the coarse registration process of FIG. 6.
Figure 10B:
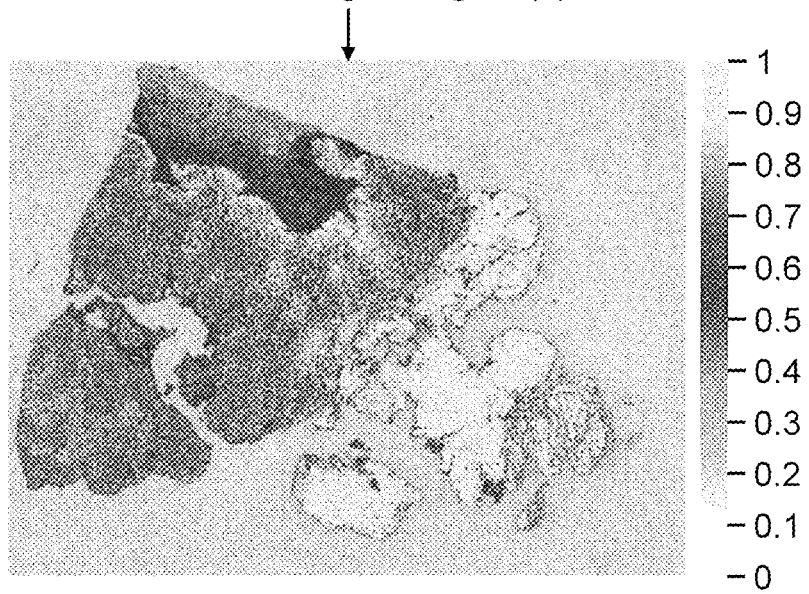
Figure 10C:
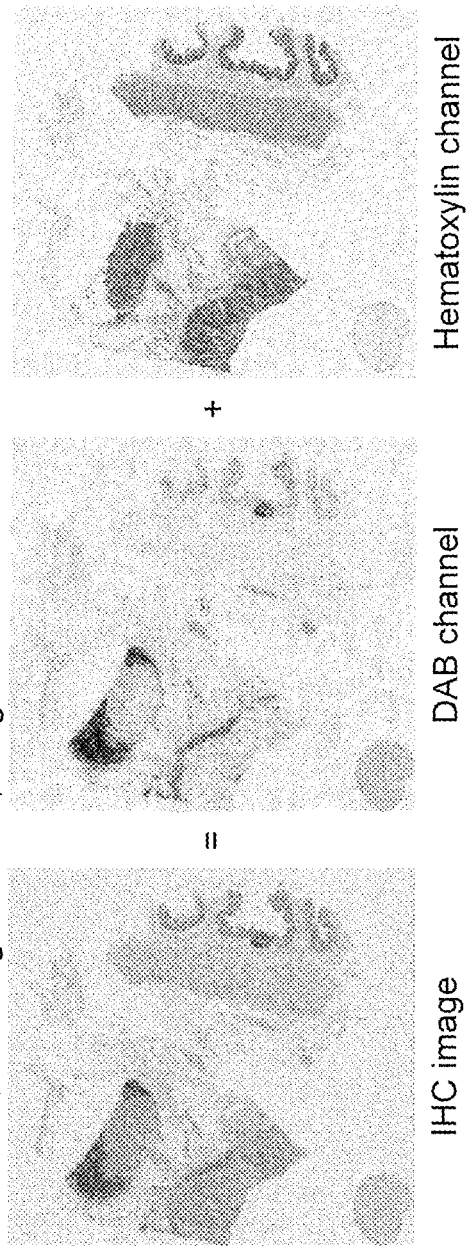
Figure 11:
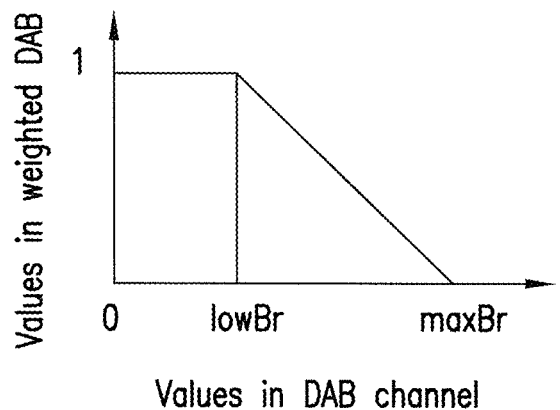
FIG. 11 illustrates an embodiment of the soft weighting process of FIG. 7 for the IHC images of FIG. 10.

FIGS. 10 and 11 together illustrate the soft weighting foreground image extraction process for an IHC image. As shown in FIG. 10C, the image extraction process is essentially a color de-convolution process, wherein the main color components are extracted from the image. For example, in the illustrated embodiment, hematoxylin (blue) and DAB (brown) are the main stain components, and color deconvolution is used to separate the IHC image into these two color channels.

The same soft weighting method, as used for HE images, is now used for the IHC image. The weighted DAB image is obtained after OTSU-based thresholding and soft weighting on the DAB channel image. Similarly, the weighted Hematoxylin image is obtained after OTSU-based thresholding and soft weighting on the Hematoxylin image. Finally, the weighted IHC image is the max(weighted DAB image, weighted Hematoxylin image), per pixel; i.e. each pixel in the weighted IHC image is the maximum of the two corresponding pixels in DAB and Hematoxylin channel images FIG. 11 illustrates an embodiment of the soft weighting process for the DAB channel image. After OTSU-based thresholding is performed, the threshold value (to separate the foreground from the background in DAB (brown) channel) is taken as levelBr. Accordingly, levelBr is the OTSU-based threshold computed on the Brown channel, lowBr is the fraction*levelBr (here, the fraction is 0.8), and maxBr is max(brown channel image); i.e. maxBr is the maximum of all the pixel values in the brown channel image. For values in the Brown channel which are lower than lowBr, the weighted DAB image is assigned a value of 1. A range of [lowBr, maxBr] in the Brown channel is mapped to a range of [1,0] in the weighted DAB image. As may be understood from this description, in brown and blue channels, lower (or higher) intensity values correspond to darker (or lighter) regions in the image. The overall process results in generating a soft weighted foreground image as shown in FIG. 10C from the original IHC image as shown in FIG. 10A.

A soft weighted foreground image can also be extracted from a fluorescent image, for example by preparing a grayscale image and applying OTSU to transform the grayscale image to a binary image. In some embodiments, as the starting point for extracting the soft weighted foreground image, a grayscale thumbnail image is read off from the fluorescent image. Then, OTSU is used to transform the grayscale thumbnail image to a binary image. And then, connected components is performed on the binary image, for example as described in Samet, Hanan, "An Improved Approach to Connected Component Labeling of Images," *Proceedings*, IEEE Computer Society Press, 1986, which is herein incorporated by reference in its entirety. In some embodiments, the connected components analysis is used to return contiguous regions in the binary image using standard algorithms. Out of the contiguous regions returned after connected components, some of the outlier regions are discarded based on predetermined criteria such as smaller cell sizes. The result of the process is to have foreground regions in the thumbnail image, where each region exceeds a certain minimum size. In some embodiments, if N is the total number of ON pixels in the foreground image, the minimum size expected from a single blob obtained from a connected component should be at least N/20—the choice of minimum area, wherein N/20 is empirically chosen. For these regions, a higher value is assigned for the soft weighted foreground image where the thumbnail image is darker (wherein the darker (or lower) intensity value regions are more likely to be tissue regions, and the lighter (or higher) intensity value regions are more likely to be non-tissue, glass regions).

Figures 12A, 12B:
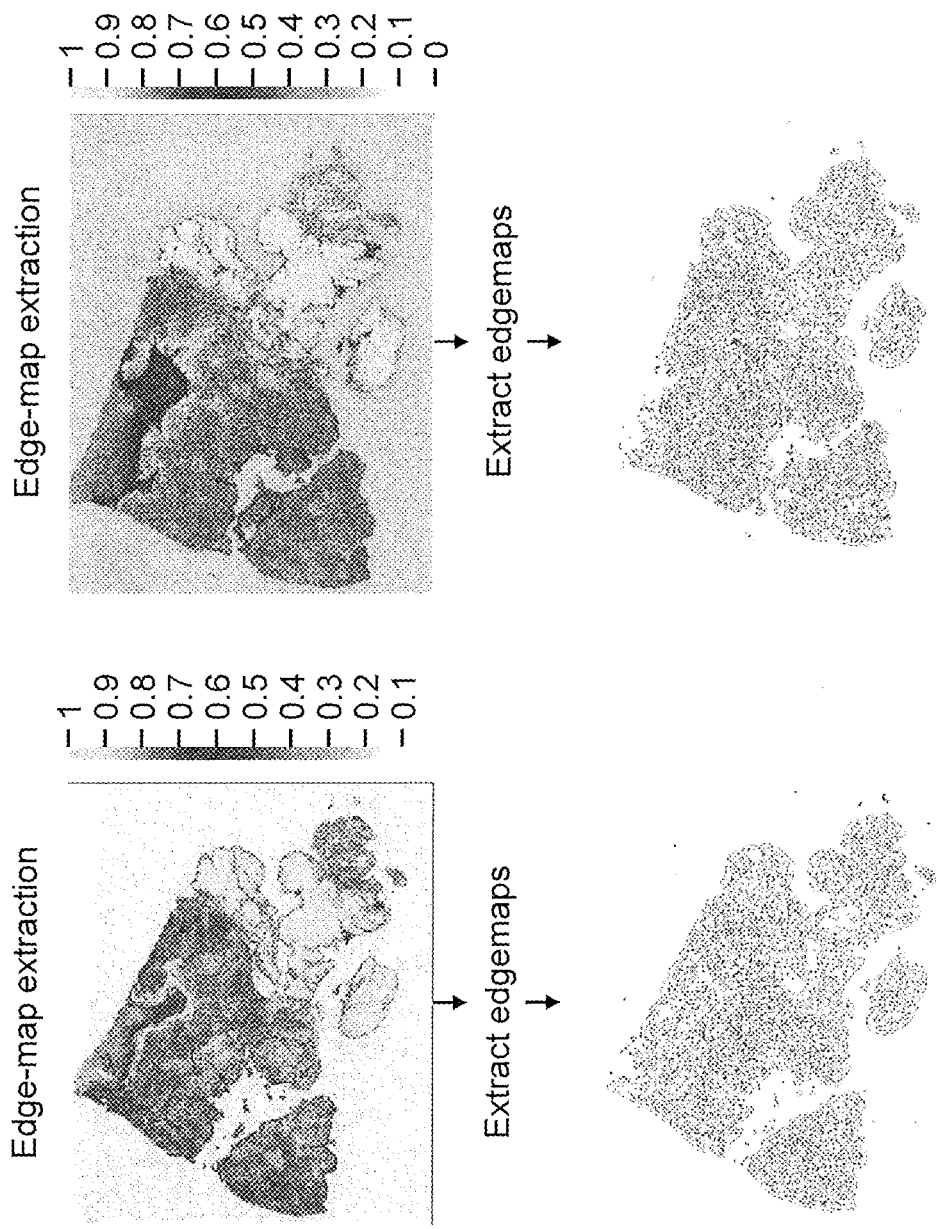
FIGS. 12A and 12B illustrate a soft weighted foreground HE image and its corresponding edge-map, as well as a soft weighted foreground IHC image and its corresponding edge-map.

After the soft weighted foreground image is extracted, global transformation parameters are estimated (block 612c, FIG. 6). In some embodiments, a first image (for example, the source image where the user/pathologist has marked certain regions) and a second image (for example a target image which the user/pathologist has selected for retrieving the marked regions) are compared to compute the global transformation. As shown in FIG. 12, in some embodiments, the comparison is done by edge-map detection (block 612b, FIG. 6). FIG. 12A illustrates an edge-map extraction for an HE image, with the top half of the figure illustrating the weighted foreground image and the bottom half illustrating the edge-map for the HE image. FIG. 12B illustrates an edge-map extraction for an IHC image, with the top half of the figure illustrating the weighted foreground image for the IHC image and the bottom half of the figure illustrating the edge-map for the IHC image.

In some embodiments, the edge-map is extracted using the Canny edge detection mode, for example as described in Canny, John, "A Computational Approach to Edge Detection," *Pattern Analysis and Machine Intelligence*, IEEE Transactions at 6 (1986); 679-698, which is herein incorporated by reference in its entirety. As a first, step, a gradient image is computed for the soft weighted foreground image which is then used for edge detection. The edge maps are then used to determine the global transformation between the two images. In some embodiments, the parameters of the global transformation that assists in mapping image 1 to image 2 are: 1) translation along the x and y axes; 2) scaling for x and y axes; 3) rotation angle; and, 4) reflection, which can be along the x axis, the y axis, or both. Based on the soft weighted foreground images, the centroid images for each image is computed; their difference gives the translation along the x and y axes, used to align the first image with the second image. Using the moments (for example as described at Hu, Ming-Kuei, "Visual Pattern Recognition by Moment Invariants," *Information Theory*, IRE Transactions, vol. IT-8, pp. 179-187, 1962, which is herein incorporated by reference in its entirety) for the soft weighted foreground images, the scale factors for the x and y axes are computed, which may align the first image with the second image. Once the soft weighted foreground images are computed, OTSU-based thresholding is performed to obtain mask images (binary images) for these soft-weighted foreground input images. Based on the mask images in the first and second image, the principal angles in both domains are computed using Hu moments; the angle difference between provides the rotation, for example as described in: Hu, Ming-Kuei, "Visual Pattern Recognition by Moment Invariants," *Information Theory*, IRE Transactions, vol. IT-8, pp. 179-187, 1962, which is herein incorporated by reference in its entirety. The angle difference between images 1 and 2 is considered as a likely value of the transformation angle which can map image 1 to image 2 (angle φ=(principle angle from image 2)–(principal angle from image 1)), where the principal angles are computed using the method of moments as described in the above mentioned publication.

Figure 13:
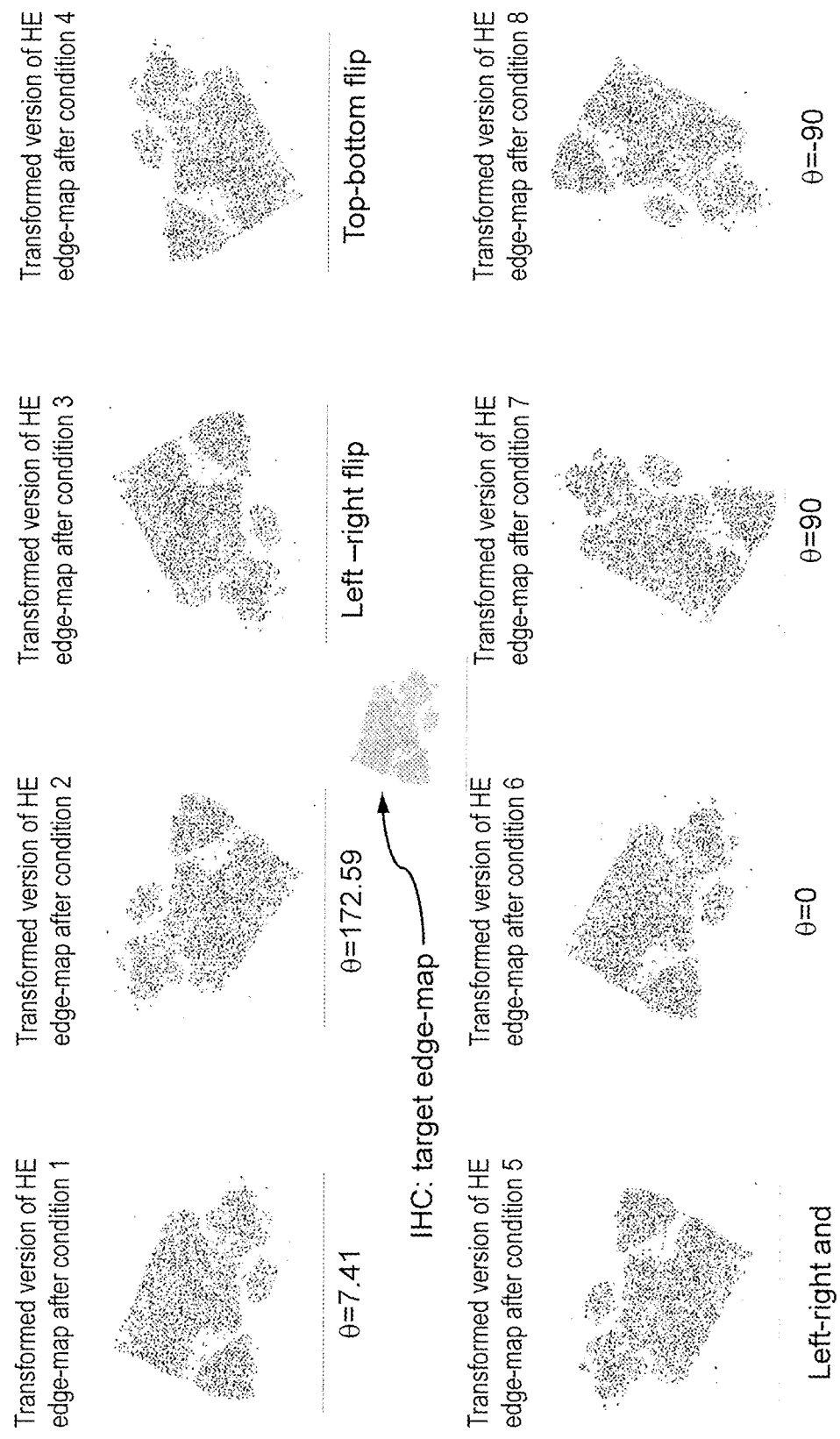
FIG. 13 illustrates a transformed HE edge-map.

In addition, in some embodiments, eight possible transformation cases are considered (each transformation case corresponds to a certain affine global transform being applied on the source image, image 1), and for each case: a) the transformed edge-map for image 1 is computed; as well as b) its distance from the edge-map of image 2. In some embodiments, the transformed edge-map (a) is based on the best transformation case, which in some embodiments is the one which produces minimum distance between the transformed edge map for image 1 and the edge-map for image 2. The eight possible transformation cases may be: 1) rotate by φ; 2) rotate by (180–φ); 3) reflect along x axis; 4) reflect along y axis; 5) reflect along both x and y axes; 6) rotate by 0; 7) rotate by 90; and, 8) rotate by –90 (scaling and translation included for all cases). FIG. 13 illustrates a HE edge-map after it has been transformed according to each of the above eight conditions.

In some embodiments, to obtain the global transformation which coarsely maps image 1 to image 2, the distance between edge maps is computed using a Chamfer distance method (for example as described in Borgefors, Gunilla, "Distance Transformations In Digital Images, Computer Vision, Graphics, and Image Processing, 34.3 (1986): 344-371, which is herein incorporated by reference in its entirety) is used. The Chamfer distance (edge-map A, edge-map B) (corresponding to each image; edge map A is obtained from the source image, image 1, while edge map B is obtained from the target image, image 2) is the average distance between every ON edge pixel in A to the nearest ON edge pixel in B. In some embodiments, the Chamfer distance may be computed as follows:

Let EA denote the edge-map A, a binary image, and DA be the matrix obtained after distance transformation. Each pixel in DA denotes the distance of that pixel in EA to the nearest ON pixel in EA.

$$\text{e.g. if } EA = \begin{bmatrix} 1 & 0 & 0 & 1 & 1 \\ 0 & 1 & 1 & 1 & 0 \\ 1 & 0 & 0 & 1 & 0 \\ 0 & 0 & 0 & 0 & 1 \\ 0 & 1 & 0 & 0 & 1 \end{bmatrix};$$

$$\text{and } DA = \begin{bmatrix} 0 & 1.0000 & 1.0000 & 0 & 0 \\ 1.0000 & 0 & 0 & 0 & 1.0000 \\ 0 & 1.0000 & 1.0000 & 0 & 1.0000 \\ 1.0000 & 1.0000 & 1.4142 & 1.0000 & 0 \\ 1.0000 & 0 & 1.0000 & 1.0000 & 0 \end{bmatrix};$$

e.g. in EA, consider the pixel in the $4^{th}$ row and $3^{rd}$ column. The two pixels, which are valued 1, and which are nearest to it are in the $3^{rd}$ row $4^{th}$ column, and in the $5^{th}$ row $2^{nd}$ column. If the location of a pixel is denoted as (i,j), it indicates that the pixel resides in the $i^{th}$ row and $j^{th}$ column of the matrix EA. So, if there are 2 pixels with locations given by $(i_1, j_1)$ and $(i_2, j_2)$, then the $L_2$ distance between the 2 pixels is given by $sqrt((i_1-i_2)^2+(j_1-j_2)^2))$. Hence, the distance of the two pixels nearest to it are sqrt(2) and sqrt(2) respectively and the value of the $4^{th}$ row and $3^{rd}$ column in DA is min(sqrt(2), sqrt(2))=sqrt(2).

Chamfer Distance (edge-map of A, edge-map of B)= (EA.*DB)/(number of 1's in EA), where DB is the distance transformation of edge-map B.

(EA.*DB)=(multiply each element in EA with every corresponding element in DB) and (then sum up the numbers)

As a person of ordinary skill in the art would understand, Chamfer Distance is not a distance metric due to its non-commutative nature. More specifically, Chamfer distance is a distance function which can be used to explain the similarity/dissimilarity between two edge-maps. The distance function can be used to compare shapes if shapes are represented by edge-maps. As applied to some embodiments according to this disclosure, Chamfer Distance mainly compares tissue regions between images; the two tissue regions are similar when their edge-maps are similar, which can be well captured by the Chamfer distance. There can be differences in color and stain intensity between the images but the edge-map is a relatively more consistent feature as it captures the structure of the tissue. When same/parallel tissue slices are compared, the structure remains more or less the same. For a distance function to be a metric, when we the distance from edge-map A to edge-map B is obtained, the distance should be the same even if obtained from edge-map B to edge-map A. For Chamfer distance, this commutative property does not hold and so it is not a metric. Consequently, in some embodiments the maximum of 2 distance values—Chamfer distance from A to B, and Chamfer distance from B to A, is used to obtain the final effective distance between the 2 edge-maps. In short, Chamfer Distance (edge-map A, edge-map B) need not be equal to Chamfer Distance (edge-map B, edge-map A). Thus, in some embodiments, the final distance measure used between edge-maps A and B is: max(Chamfer Distance (edge-map A, edge-map B), Chamfer Distance (edge-map B, edge-map A)). And, in some embodiments, once these distance values are computed for all eight conditions, the condition resulting in the lowest distance value is selected.

Figure 14:
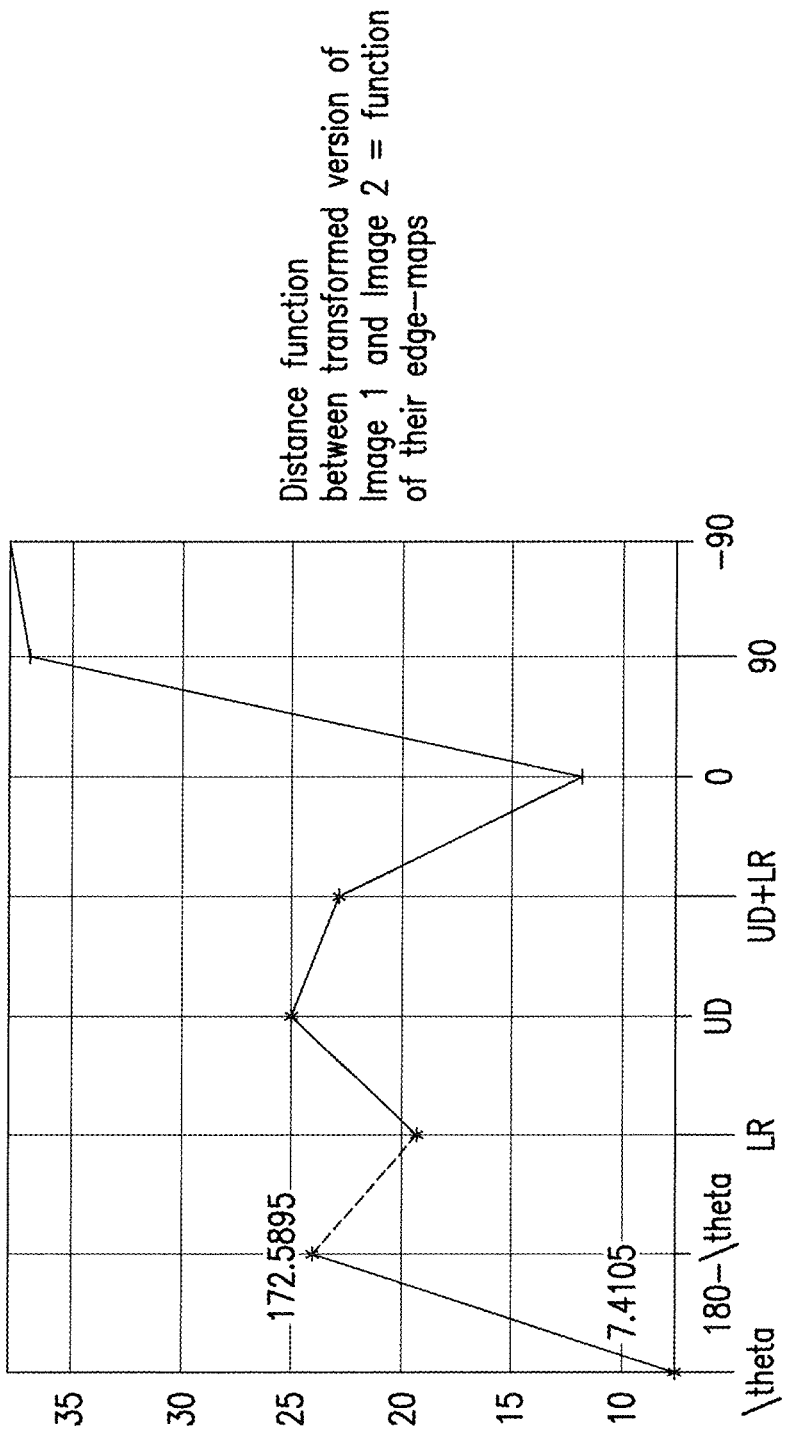
FIG. 14 is an example of a graph of Chamfer distance values in relation to each of eight transformation conditions.

FIG. 14 is an example of the eight computed distance values (the distance function used between transformed versions of the first image and the second image is the function of their edge-maps based on the Chamfer distance). In accordance with that example, the best transformation is found to be that using a rotation angle of 7.41—the $1^{st}$ transformation condition is selected as it results in the minimum Chamfer distance.

Figure 15A:
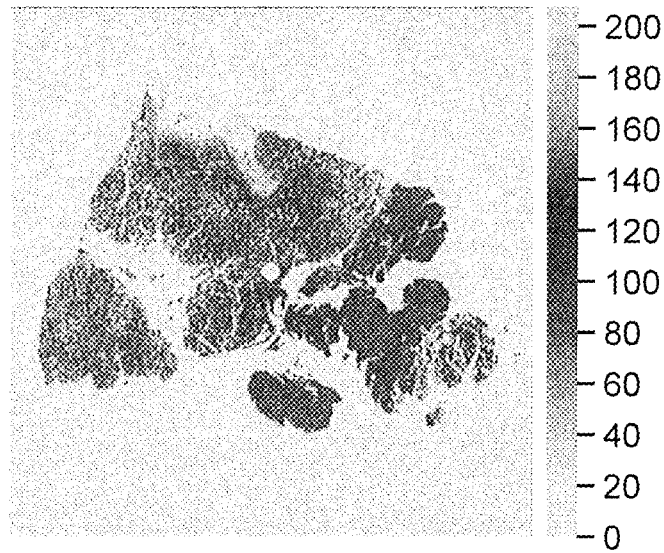
FIGS. 15A and 15B illustrate a HE image and an IHC image, respectively, that have been aligned on a common grid using global transformation parameters which have been computed in accordance with an embodiment of this disclosure.
Figure 15B:
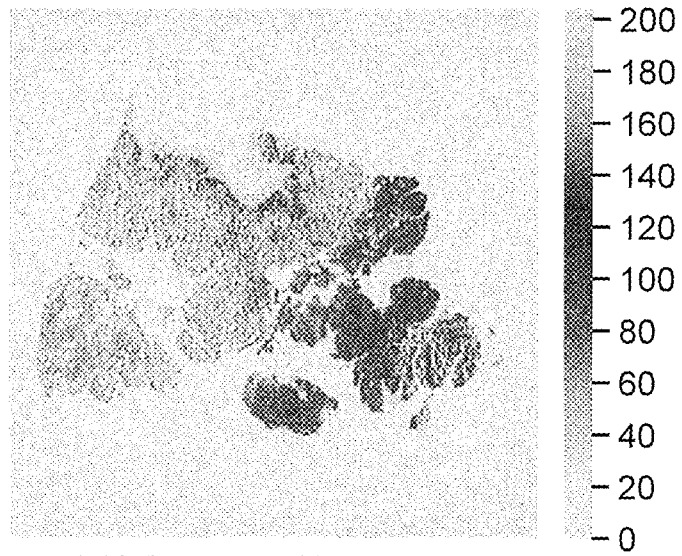

FIG. 15 illustrates an embodiment of block 612 of FIG. 5, wherein registered images are displayed on a common grid after the global transformation parameters are computed (block 612c, FIG. 6). More specifically, in the embodiment, FIG. 15 illustrates a HE and IHC image mapped on a common big image grid, for which in FIG. 15A, the center of the grid coincides with the moment-based center, of the soft weighted foreground HE image common grid, and for which in FIG. 15B, the center of the grid coincides with the moment-based center of the soft weighted foreground IHC image. The common grid, which contains both the transformed versions of the first (e.g. source) and second (e.g. target) images, may be useful to recover any region in the second image, based on a marked region in the first image.

Figure 16:
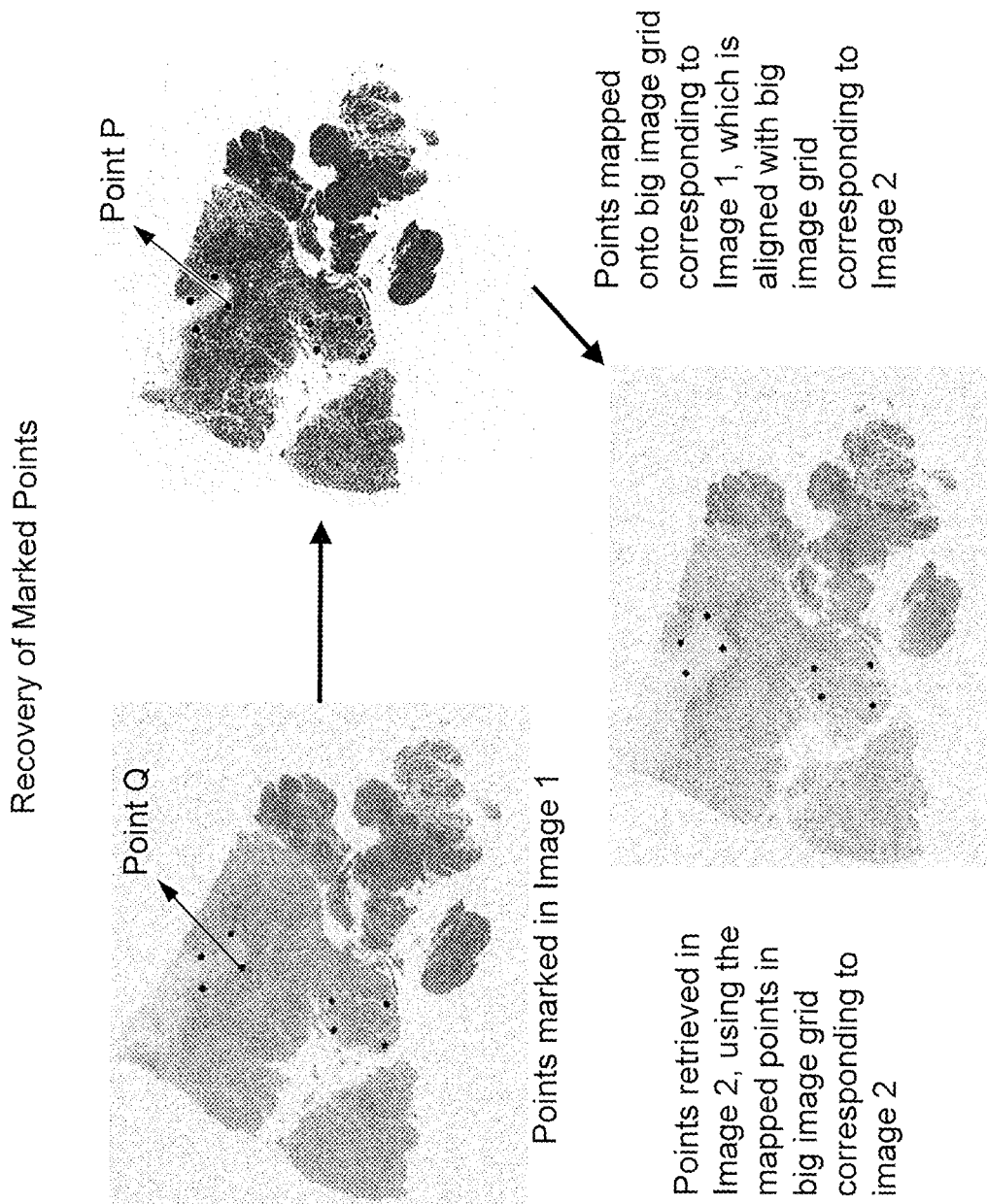
FIG. 16 illustrates the results of mapping an annotation from a first image to a second image only after a coarse registration process according to this disclosure.

Cross-image annotation (blocks 620, 622 FIG. 5) may occur when this big, common grid is obtained which contains both images. For example, in some embodiments, as shown in FIG. 16, a user marked point (in the first image) may be mapped first to the matching region in the big grid, and then a point in the big grid is mapped to the corresponding location in the second image. Consequently, in the described embodiment, the first image is an image in which the pathologist has marked some regions. Cross-image annotation is effectuated by using the best transformation obtained out of eight conditions (rotation angle 7.41 in the example) to arrive at a big, common image grid, which in the example contains the soft weighted foreground image at its center. The process of arriving at a big, common grid can be described more specifically, for example as follows:

Let the source image 1 be an image with M1 rows and N1 columns, and let the location of its centroid be (x1, y1). Then the distance of the centroid from leftmost and rightmost points of image 1 is (x1−0) and (N1−1−x1). Similarly, the distance of the centroid from the topmost and bottommost points in image1 is (y1−0) and (M1−1−y1). For the target image, image 2, let its size be M2 rows and N2 columns. Let the location of its centroid be (x2, y2). Then, the distance of the centroid from the leftmost and rightmost points of image 2 are (x2−0) and (N2−1−x2). Similarly, the distance of the centroid from the topmost and bottommost points of image 2 are (y2−0) and (M2−1−y2). The images 1 and 2 are placed on the common big grid such that the center of the big common grid coincides with the center of both image 1 and image 2. Therefore, the maximum distance of the centroid in the big, common image grid to any of its boundary points (leftmost, rightmost, topmost or bottommost) is max of these 8 terms {(x1−0), (N1−1−x1), (y1−0), (M1−1−y1), (x2−0), (N2−1−x2), (y2−0), (M2−1−y2)}. Let this maximum distance term be denoted by d. Then the size of the big, common image grid=2*d+1, per side. This grid is a square grid and hence it has 2*d+1 rows and 2*d+1 columns.

As can been seen in FIG. 16, there may be a slight mismatch between the user marked points marked in the first image and the points recovered in the second image. In such a case, a fine registration module (block 624, FIG. 5) may be implemented to further refine the annotation location. In general, in some embodiments, the fine registration process involves defining a first window around the user marked region in the first image, defining a second window in the second image, wherein the second window is larger than the first window but is substantially co-located with the first window on the common grid; and, computing an optimized location for the first window in the second window. In some embodiments, the location of the first window in the second window is optimized by iteratively shifting a window equal, or substantially equal, in size to the first window within the second window to identify a best match. An embodiment of the described fine registration process is provided by way of example below and with reference to FIGS. 17 and 18.

Figure 17:
FIG. 17 illustrates an initial step of an embodiment of a fine registration process in accordance with this disclosure.
Figure 18:
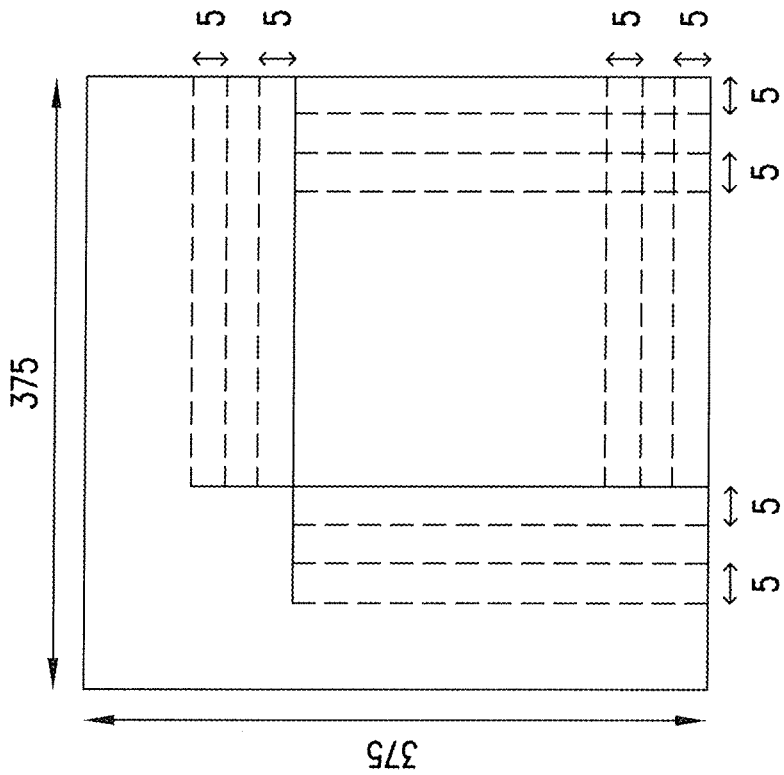
FIG. 18 illustrates additional steps of the fine registration process of FIG. 17.
Figure 18:
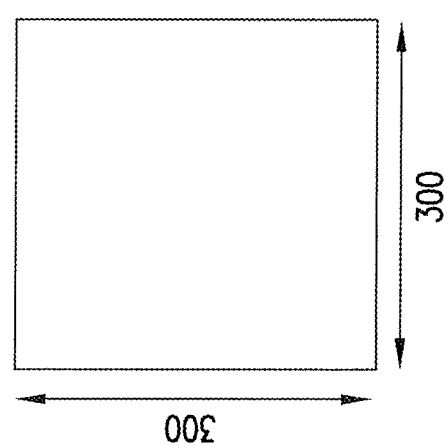

As shown in FIGS. 17 and 18:
When point Q is marked in image 1, it is shown to correspond to point P in the big grid corresponding to image 1 (see FIG. 17 for definitions of points P and Q);
If the coarse transformation is accurate, the best choice for the retrieved point will be close to P in the big grid;
Consider a W×W (pixels×pixels) (let W=300) window around point P in the big grid to find the likely candidates for best matched point; in each case, consider an L×L (pixels×pixels) (let L=375) region around point P in the big grid considering image 1, and a L×L region around each new shifted point in the big grid considering image 2 (W=300 and L=375 are used in FIG. 18);
Local Chamfer is done based on the local edge-maps in these L×L regions and the minimum cost window is selected to optimally shift the result of coarse matching;
As an example: if L−W=75 and the best possible shifts are searched with an increment of 5 pixels, the total number of search points=$(75/5)^2$=225 (the choice of 5 is for computational complexity reduction; a shift of 1 pixel would have resulted in 75×5=5625 data points). From a computational point of view, computing the edge-map and the distance transformation of the edge-map for each of the 225 search point may be computationally intensive. Accordingly, in some embodiments, the possible computational issues are addressed by computing and storing the distance transformation of the entire edge-map; then, in some embodiments, suitable windows are cropped out of the edge-image and distance transformation image to speed up the computation. In some embodiments, suitable windows are large enough so that when two regions are compared in the two images, there is enough edge-based content in these windowed regions to clearly decide when the right window has been found in the second image for a given template window in the first image; if the window size is very small, the distance between "template window-to-search window" may be small enough that identifying the best window in the search image may be difficult; on the other hand, a higher window size will increase the computational complexity. Stated otherwise, edge-map computation and distance transformation for every edge-map (based on local regions) may be computationally intensive. Therefore, in some embodiments, edge-map is computed once for image 1 and image 2, after they are both mapped to big image grids, and then their distance transformation matrices are saved. In some embodiments, when local regions (windows) are considered, cropped versions of the edge-map and distance transform map are used. Accordingly, re-computing edge-maps and distance transformations maps for local regions may be avoided.

The distance transform of a binary image (edge map image) may be computed using the formulation described in Borgefors, Gunilla, "Distance Transformations In Digital Images, Computer Vision, Graphics, and Image Processing, 34.3 (1986): 344-371, which is herein incorporated by reference in its entirety. As described in [0089], there is no unit associated with the distance transform. It is implied that the distance mentioned is in terms of the number of pixels. The distance transform value at a given image pixel is the distance from that pixel to the nearest ON image pixel (an ON pixel is a pixel with a value of 1 in an edge-map, i.e. it is an edge point).

The size of the window depends on the size of the input annotation, marked by the user, or already present in image 1. For example, if the user has marked an annotation of size 60×70 pixels in the scale at which the analysis is done (e.g. 2× resolution), then the window size being used to compare a window in the source image (image 1) with its surrounding region in the target image is also 60×70. Once coarse registration is done, the two images are roughly aligned with each other and both the matched images are superimposed on the same grid, as shown in FIGS. 16, 17 and 18. This helps in searching a nearby region to find the best matched window, as demonstrated in FIG. 18.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft.NET framework. Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future. A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques. System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications. A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc. A number of embodiments have been described but a person of skill understands that still other embodiments are encompassed by this disclosure. It will be appreciated by those skilled in the art that changes could be made to the embodiments described above without departing from the broad inventive concepts thereof. It is understood, therefore, that this disclosure and the inventive concepts are not limited to the particular embodiments disclosed, but are intended to cover modifications within the spirit and scope of the inventive concepts including as defined in the appended claims. Accordingly, the foregoing description of various embodiments does not necessarily imply exclusion. For example, "some" embodiments or "other" embodiments may include all or part of "some", "other," "further," and "certain" embodiments within the scope of this invention.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

The invention claimed is:

1. A system, comprising:
   a processor; and
   a computer-readable medium coupled to the processor, the computer-readable medium storing instructions which, when executed by the processor, cause the processor to perform operations comprising:
   receiving a mask generated based on anatomical information identified from one or more images of one or more anatomical assays, wherein each image of the one or more images depicts a tissue section of a set of tissue sections corresponding to a tissue specimen, and wherein the mask is usable to define:
   a first region that corresponds to a macroscopic type of anatomical structure; and one or more second regions that correspond to a microscopic type of anatomical structure;

projecting the mask on an image of a staining assay that depicts another tissue section of the tissue specimen, the other tissue section being different from each tissue section of the set of tissue sections;

defining, based on the projection of the mask on the image of the staining assay, a set of regions that include at least the first region and the one or more second regions;

detecting a feature of interest in the at least one of the set of regions defined by projection of the mask on the image of the staining assay; and outputting information that identifies the feature of interest.

2. The system of claim 1 wherein the operations further comprise determining a common feature between the one or more images of the one or more anatomical assays and the image of the staining assay and establishing a common registration for the staining assay and the one or more anatomical assays.

3. The system of claim 1, further comprising associating a location of the feature of interest with one or more regions of the set of regions.

4. The system of claim 1, wherein the staining assay is one among a plurality of staining assays corresponding to a plurality of adjacent slides of the tissue specimen.

5. The system of claim 4, wherein images of the plurality of staining assays and the one or more images of the one or more anatomical assays share a common registration.

6. The system of claim 4, wherein images of the plurality of staining assays are arranged with the one or more images of the one or more anatomical assays such that the one or more images of the one or more anatomical assays are at or near a center position of an arranged order of the images of the plurality of staining assays.

7. The system of claim 1, wherein the operations further comprise performing a feature correlation that corresponds to a quantity of the second regions that are within the first region.

8. The system of claim 1 wherein the one or more images of one or more anatomical assays correspond to one or more slides of a tissue section, and wherein the image of the staining assay corresponds to a different slide of a different tissue section.

9. A system, comprising:
a processor; and
a computer-readable medium coupled to the processor, the computer-readable medium storing instructions which, when executed by the processor, cause the processor to perform operations comprising:
generating a mask based on anatomical information identified based on one or more images of one or more anatomical assays, wherein each image of the one or more images depicts a tissue section of a set of tissue sections corresponding to a tissue specimen, the mask identifying a set of regions that include:
a first region that corresponds to a macroscopic type of anatomical structure; and
one or more second regions that correspond to a microscopic type of anatomical structure;
projecting the mask on an image of a staining assay that depicts another tissue section of the tissue specimen, the other tissue section being different from each tissue section of the set of tissue sections; and
detecting a feature of interest in the staining assay based on the projection of the mask on the image of the staining assay, wherein the feature of interest corresponds to at least one region of the one or more second regions.

10. The system of claim 9, wherein generating the mask includes:
accessing a first image of the one or more anatomical assays that corresponds to a first stain;
detecting an outline of the first region from the first image;
accessing a second image of the one or more anatomical assays that corresponds to a second stain;
detecting, for each second region of the one or more second regions, an outline of the second region; and
generating the mask to include representations of the outlines of the first region and the one or more second regions.

11. The system of claim 9, wherein the first region that corresponds to the macroscopic type of anatomical structure includes an outline of: a tumor, a region of a tumor, a tumor gland, an invasive margin of a tumor, a primary tumor, or a site of metastasis.

12. The system of claim 9, wherein the one or more second regions that correspond to the microscopic type of anatomical structure include an outline of a stroma, microvessel or gland.

13. The system of claim 9, wherein generating the mask includes:
detecting a set of user inputs received via an interface; and
defining the set of regions based on the set of user inputs.

14. The system of claim 9, wherein projecting the mask includes presenting an outline of the first region and an outline of each of the one or more second regions on the image of the staining assay.

15. The system of claim 1, wherein the set of regions include a proliferative region, a stroma region, or a necrotic region.

16. A tangible non-transitory computer-readable medium to store computer-readable code that, when executed by a processor, causes the processor to perform operations comprising:
receiving a query for one or more features of interest on an image of a staining assay corresponding to a first tissue section of a tissue specimen;
based on the query, retrieving an anatomical mask generated based on anatomical information from an image of an anatomical assay corresponding to a second tissue section of the tissue specimen, wherein the anatomical mask identifies a set of regions that include:
a first region that corresponds to a macroscopic type of anatomical structure; and
one or more second regions that correspond to a microscopic type of anatomical structure;
projecting the anatomical mask onto the image of the staining assay;
identifying, based on the projection of the anatomical mask, the one or more features of interest from the image of the staining assay; and
outputting a response to the query, the response indicating the one or more features of interest.

17. The computer-readable medium of claim 16, wherein the anatomical mask identifies one or more of a tumor, a tumor center, an invasive front, a tumor region with a selected feature, a cell nucleus, and a tissue type.

18. The computer-readable medium of claim 17, wherein the one or more features of interest comprise any combination of a gene expression, a protein expression, and a population of immune cells.

19. The computer-readable medium of claim 16, wherein the staining assay is a part of a breast panel of assays.

20. The computer-readable medium of claim 19, wherein the one or more features of interest comprise any combination of an estrogen receptor, a progesterone receptor, and a proliferation marker.

* * * * *